United States Patent
Sawai et al.

(10) Patent No.: US 9,499,045 B2
(45) Date of Patent: Nov. 22, 2016

(54) WORKING VEHICLE

(71) Applicant: Kubota Corporation, Osaka-shi (JP)

(72) Inventors: Megumi Sawai, Sakai (JP); Kazunobu Sugano, Sakai (JP); Shinsuke Kashiyama, Sakai (JP); Motoki Izukura, Sakai (JP); Koji Kajino, Sakai (JP); Tatsuya Ueda, Sakai (JP); Kenichi Aoyama, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/490,047

(22) Filed: Sep. 18, 2014

(65) Prior Publication Data
US 2015/0217634 A1 Aug. 6, 2015

(30) Foreign Application Priority Data

Jan. 31, 2014 (JP) ................. 2014-017372
Jan. 31, 2014 (JP) ................. 2014-017373

(51) Int. Cl.
| B60K 13/04 | (2006.01) |
| B60K 15/067 | (2006.01) |
| F01N 3/021 | (2006.01) |
| F01N 3/10 | (2006.01) |
| F01N 13/18 | (2010.01) |
| F01N 3/035 | (2006.01) |
| B60K 15/063 | (2006.01) |

(52) U.S. Cl.
CPC ............ *B60K 13/04* (2013.01); *B60K 15/063* (2013.01); *B60K 15/067* (2013.01); *F01N 3/021* (2013.01); *F01N 3/035* (2013.01); *F01N 3/106* (2013.01); *F01N 13/1822* (2013.01); *F01N 13/1855* (2013.01); *B60K 2015/0637* (2013.01); *B60Y 2200/221* (2013.01)

(58) Field of Classification Search
CPC . B60K 15/07; B60K 15/067; B60K 15/0637
USPC ........................................... 280/834
See application file for complete search history.

(56) References Cited

U.S. PATENT DOCUMENTS

| 5,186,324 A * | 2/1993 | Brandon, Jr. ........ B60P 1/162 137/592 |
| 6,886,861 B2 * | 5/2005 | Marsala ................ B60K 15/01 280/830 |
| 7,464,782 B2 * | 12/2008 | Hirakawa ........... B60K 15/063 180/89.12 |
| 8,100,212 B2 * | 1/2012 | Sawai ................... B62D 25/14 180/69.2 |
| 2013/0186077 A1 | 7/2013 | Morimoto et al. |
| 2015/0097364 A1 * | 4/2015 | Moloney ............... B60K 15/07 280/834 |

FOREIGN PATENT DOCUMENTS

| JP | 8132897 A | 5/1996 |
| JP | 2005343182 A | 12/2005 |
| JP | 201349405 A | 3/2013 |

* cited by examiner

*Primary Examiner* — Kevin Hurley
(74) *Attorney, Agent, or Firm* — The Webb Law Firm

(57) ABSTRACT

Provided is a working vehicle comprising: a fuel tank; a tank support member configured to receive and support the fuel tank from below; and an inverse U-shaped hood support member provided upright in a state of spanning left and right of the fuel tank, the hood support member including an elastic member that acts on an upper portion side of the fuel tank so as to hold the fuel tank at a predetermined position on the tank support member.

9 Claims, 16 Drawing Sheets

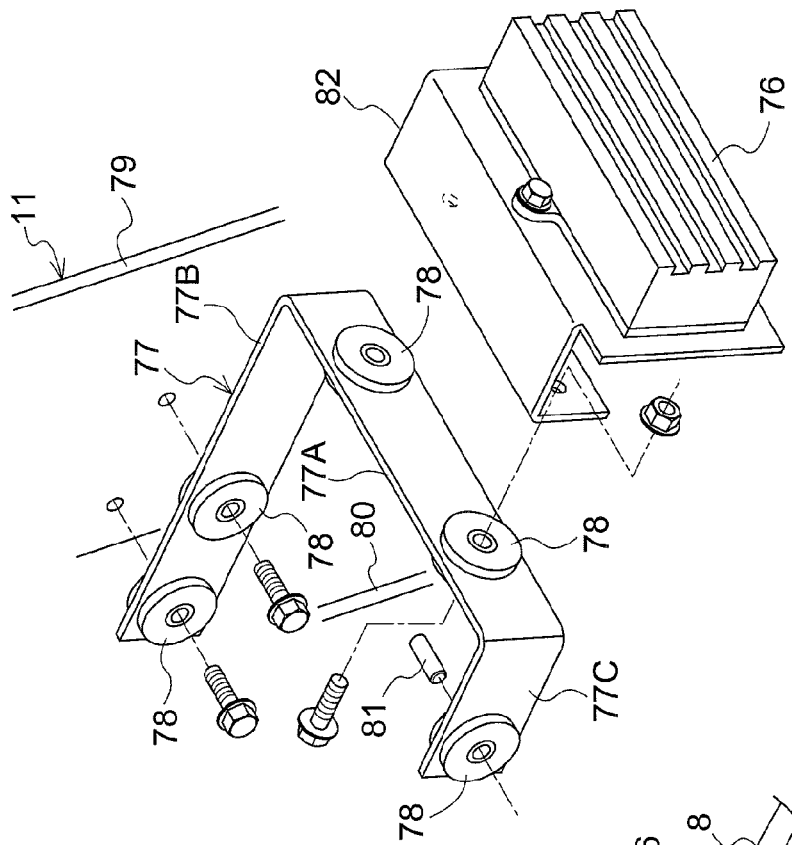
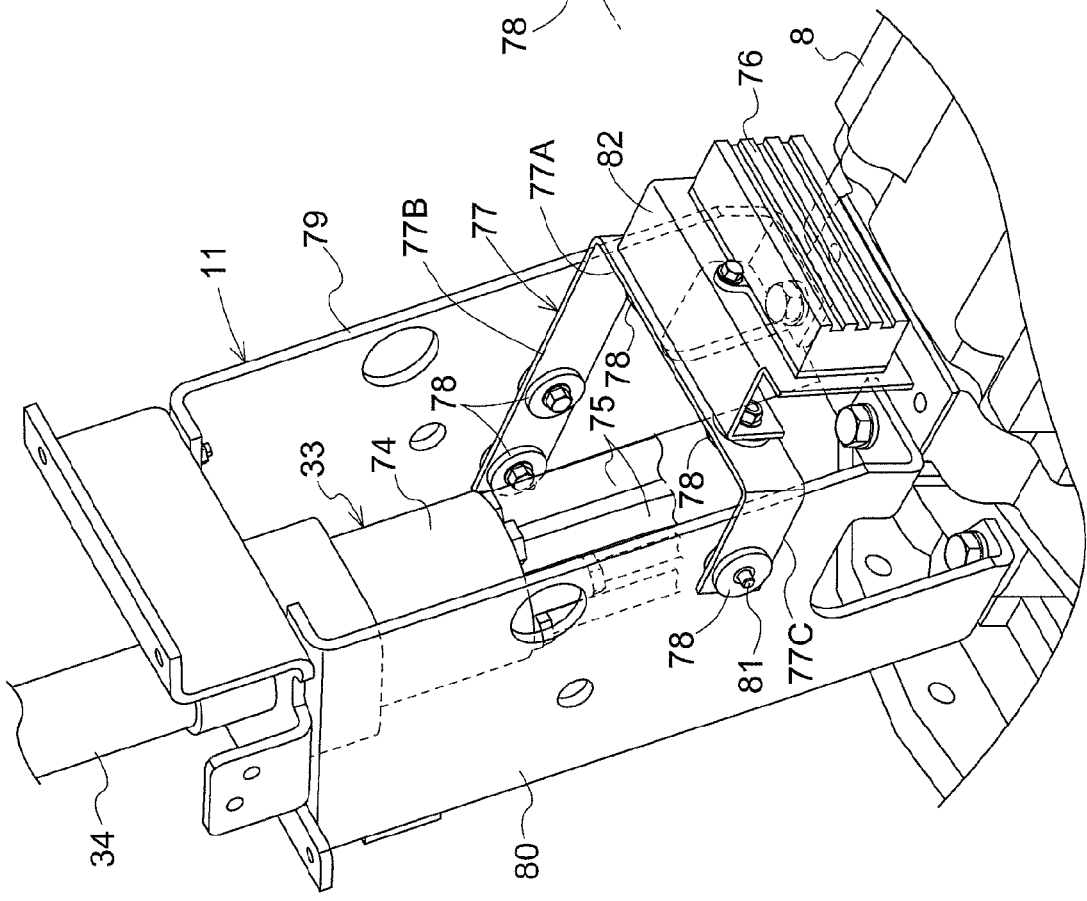
Fig.16B
Fig.16A

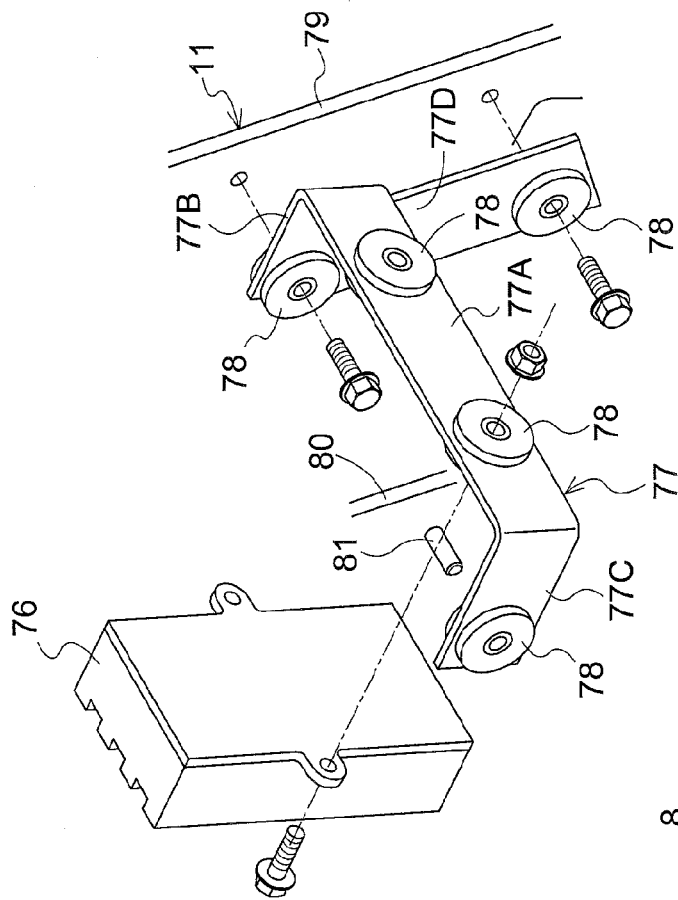
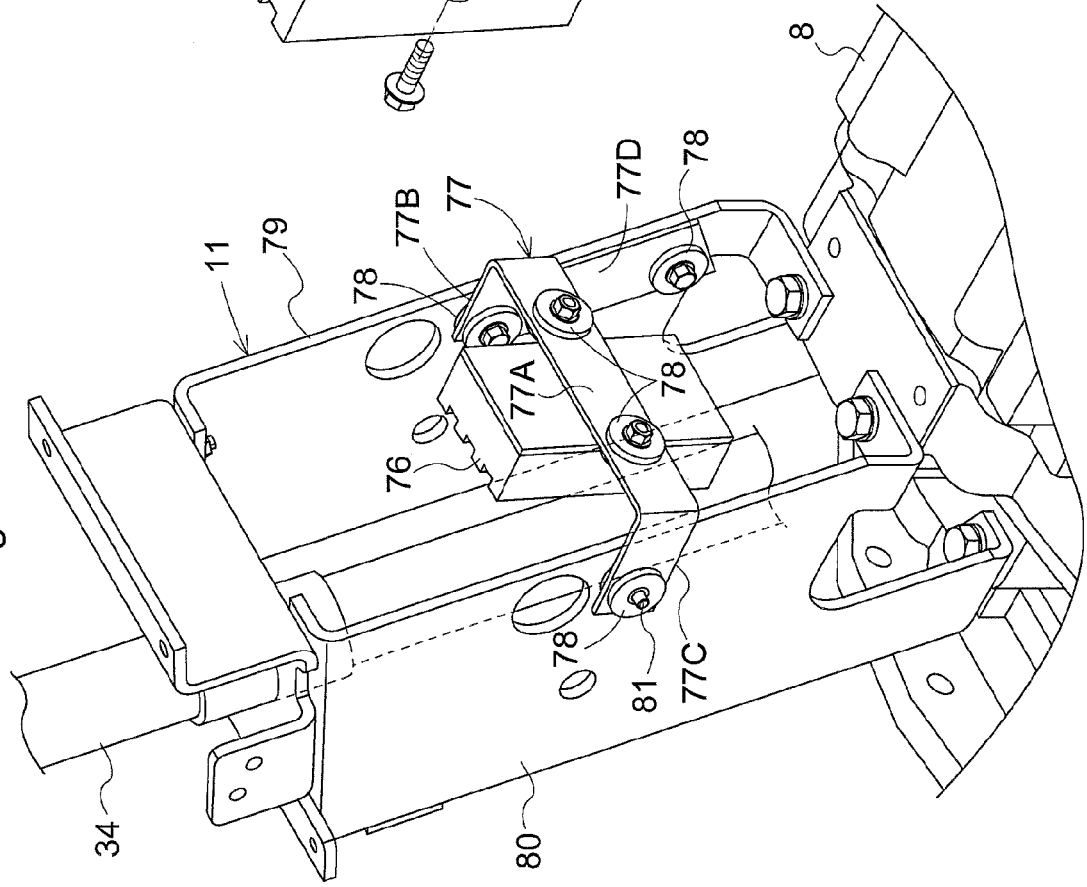

WORKING VEHICLE

CROSS-REFERENCE TO RELATED APPLICATIONS

This application claims priority to Japanese Patent Application Nos. 2014-017372 and 2014-017373, both filed Jan. 31, 2014, the disclosures of which are hereby incorporated in their entirety by reference.

FIELD OF THE INVENTION

The present invention relates to a working vehicle.

BACKGROUND

A riding lawnmower that is an example of a working vehicle is disclosed in JP H8-132897A (paragraph number 0015, FIGS. 1 to 3), for example. A fuel tank is equipped in a fixed manner in a riding lawnmower by fixing a fuel tank to a vehicle body frame via a band in a state in which a protruding portion formed on a side surface of the fuel tank is fitted into an outward-facing C-shaped frame on the vehicle body frame.

Also, a tractor that is an example of a working vehicle is disclosed in JP 2005-343182A (paragraph number 0019, FIGS. 2 and 4). A fuel tank is equipped in a fixed manner in the tractor by using multiple bolts to couple a flange portion provided around the fuel tank to a hood support frame installed in a standing manner on the vehicle body frame.

Also, a tractor that is an example of a working vehicle is disclosed in JP 2013-49405A (paragraph number 0034, FIGS. 2 to 4). The tractor is configured such that an exhaust cleaning device (exhaust gas cleaning device), which is configured so as to be disassemblable in the lengthwise direction in order to enable maintenance such as exchanging a DPF (diesel particulate filter) installed in the tractor, is coupled to a center frame via a support frame having a welded structure.

With the configuration disclosed in JP H8-132897A, due to the fact that a protruding portion for fitting needs to be formed on the fuel tank, the shape of the fuel tank is complex, and the manufacturing cost of the fuel tank increases accordingly. Also, due to the fact that a dedicated band is needed to fix the fuel tank, there is room for improvement in achieving a simpler configuration for assembling the fuel tank.

With the configuration disclosed in JP 2005-343182A, due to the fact that a flange portion for coupling needs to be formed on the fuel tank, the shape of the fuel tank is complex, and the manufacturing cost of the fuel tank increases accordingly. Also, due to the fact that the coupling of the fuel tank to the support frame is performed using multiple bolts, labor is needed in the assembly of the fuel tank.

In view of the foregoing problems, it is desired that a reduction in cost is achieved and assembly of the fuel tank is simplified.

Also, due to the fact that the exhaust cleaning device disclosed in JP 2013-49405A is configured so as to be disassemblable in the lengthwise direction, individual differences relating to the positional relationship in the lengthwise direction and the like tend to occur between a suction portion for connecting to an engine exhaust portion and the portion coupled to the support frame that are disposed so as to be distributed in the lengthwise direction of the exhaust cleaning device. For this reason, in the case where an exhaust cleaning device is coupled to the center frame via the support frame, an inconvenience tends to be incurred in which the position of the suction portion in the exhaust cleaning device is shifted in the lengthwise direction of the exhaust cleaning device from the position of connecting to the exhaust portion of the engine.

In contrast to this, with the aforementioned configuration, due to the fact that a support frame with a welded structure is used to support the exhaust cleaning device, if a positional shift as described above occurs, there will be a problem connecting the suction portion of the exhaust cleaning device and the exhaust portion of the engine. In other words, there is room for improvement in increasing the ease with which the exhaust cleaning device is assembled.

In view of the foregoing problems, it is desired that the ease with which the exhaust cleaning device is assembled is improved.

SUMMARY OF THE INVENTION

A working vehicle according to the present invention includes:

a fuel tank;

a tank support member configured to receive and support the fuel tank from below; and an inverse U-shaped hood support member provided in a standing manner in a state of spanning left and right of the fuel tank, the hood support member including an elastic member that acts on an upper portion side of the fuel tank so as to hold the fuel tank at a predetermined position on the tank support member.

According to the above-described configuration, for example, after the fuel tank is placed on the tank support member, the hood support member including the elastic member is provided in a standing manner, and it is thereby possible to hold the fuel tank in a fixed manner at a predetermined location on the tank support member. In other words, it is not necessary to form a fitting portion, a coupling portion, or the like in the fuel tank, and the number of dedicated parts needed for assembling the fuel tank can be reduced. Also, it is possible to eliminate the need for or reduce specialized labor for assembling the fuel tank. Accordingly, assembly of the fuel tank can be simplified while a reduction in cost is achieved.

With the above configuration, it is preferable that the elastic member includes left and right elastic members that act externally from above lateral sides of the fuel tank and on left and right corner portions on the upper side of the fuel tank, and the fuel tank is held in a sandwiched manner between the tank support member and the left and right elastic members due to the elasticity of the left and right elastic members.

According to the above-described configuration, it is possible to hold the fuel tank in a fixed manner more appropriately than in the case where the elastic member is provided on the upper portion of the hood support member and the fuel tank is held in a fixed manner by being sandwiched in the up-down direction between the tank support member and the elastic member, the case where the elastic member is provided on both the left and right sides of the hood support member and the fuel tank is held in a fixed manner by being sandwiched in the left-right direction between the left and right elastic members, or the like, for example.

Accordingly, by merely including the left and right elastic members as dedicated parts needed for assembly of the fuel tank, it is possible to hold the fuel tank in a fixed manner more reliably.

With the above configuration, it is preferable that one of the left and right elastic members is fixed to the inner surface of the hood support member, and the other one is detachably coupled to the hood support member.

According to the above-described configuration, by attaching and detaching one of the left and right elastic members with respect to the hood support member, it is easy to switch between a state where the fuel tank is held in a sandwiched manner between the tank support member and the left and right elastic members, and a state where holding in a sandwiched manner is canceled. In other words, it is possible to assemble or remove the fuel tank without assembling or removing the hood support member. Accordingly, the ease with which the fuel tank is assembled and maintained can be improved.

With the above configuration, it is preferable that the hood support member and the elastic member are configured to act on one of the front and rear sides of the fuel tank, an inverse U-shaped fixing band that is detachably coupled to the tank support member in a state of spanning left and right of the other of the front and rear sides of the fuel tank is included, and the fuel tank has a groove portion into which the fixing band is fitted on the other of the front and rear sides of the fuel tank.

According to the above-described configuration, it is possible to hold both the front and rear sides of the fuel tank in a fixed manner. Accordingly, even in the case of using a large fuel tank that is longer in the front-rear direction, it is possible to appropriately hold the fuel tank in a fixed manner. Also, by fitting the fixing band into the groove portion of the fuel tank, the fuel tank can be held in a fixed manner in the front-rear direction more reliably. Accordingly, the fuel tank can be held in a fixed manner more appropriately, and a large-sized fuel tank can also be handled.

A working vehicle according to the present invention includes:

an engine having an exhaust portion;

an exhaust cleaning device having a suction portion connected to the exhaust portion; and a support frame configured to support the exhaust cleaning device, the support frame including a first part that couples to a first end portion in the lengthwise direction of the exhaust cleaning device, a second part that is coupled to a second end side in the lengthwise direction of the exhaust cleaning device, and a third part that is coupled to an engine, the first part, the second part, and the third part being divisible from each other;

a first adjustment portion configured to allow adjustment of the position of the first part in the lengthwise direction of the exhaust cleaning device with respect to the engine; and a second adjustment portion configured to allow adjustment of the position of the second part in the lengthwise direction of the exhaust cleaning device with respect to the engine.

According to this aspect, in the exhaust cleaning device, even if individual differences relating to the positional relationship in the lengthwise direction of the exhaust cleaning device between the suction portion and the portions coupled to the support frame, and the like occur, the respective positions of the first part and the second part of the support frame that couple to the exhaust cleaning device can be adjusted in the lengthwise direction of the exhaust cleaning device in response to the individual differences. Accordingly, regardless of individual differences in the lengthwise direction of the exhaust cleaning device and the like, the exhaust cleaning device can be easily provided in a fixed manner at an appropriate position with respect to the engine, and the suction portion of the exhaust gas cleaning device and the exhaust portion of the engine can be connected easily and appropriately. Accordingly, the ease with which the exhaust cleaning device is assembled can be improved.

With the above configuration, it is preferable that the first part has a first coupling portion that detachably bolts to a first coupled portion provided in the third part, and the second part has a second coupling portion that detachably bolts to a second coupled portion provided in the third part, the first adjustment portion is constituted by an elongated hole formed so as to be longer in a direction along the lengthwise direction of the exhaust cleaning device, the elongated hole being formed in at least one of the first coupling portion and the first coupled portion, and the second adjustment unit is constituted by an elongated hole formed so as to be longer in a direction along the lengthwise direction of the exhaust cleaning device, the elongated hole being formed in at least one of the second coupling portion and the second coupled portion.

According to the above-described configuration, with a simple configuration of merely including an elongated hole serving as a first adjustment portion and an elongated hole serving as a second adjustment portion, the ease with which the exhaust cleaning device is assembled can be improved.

With the above configuration, it is preferable that the elongated hole constituting the first adjustment portion and the elongated hole constituting the second adjustment portion are each set such that the length in the short-side direction of each of the elongated holes is greater than a bolt diameter, and thus adjustment of the position of the first part or the second part in the short-side direction of the elongated hole with respect to the engine is made possible.

According to the above-described configuration, in the exhaust cleaning device, even if individual differences relating to the positional relationship in the short-side direction of the elongated holes, which is perpendicular to the lengthwise direction of the exhaust cleaning device, between the suction portion and the portions coupled to the support frame, and the like occur, the respective positions of the first part and the second part of the support frame that couples to the exhaust cleaning device can be adjusted in the short-side direction of the elongated holes in response to the individual differences. Accordingly, regardless of individual differences in the lengthwise direction of the exhaust cleaning device and in the short-side direction of the elongated holes that is perpendicular to the lengthwise direction, and the like, the exhaust cleaning device can be easily equipped in a fixed manner at an appropriate position with respect to the engine, and the suction portion of the exhaust gas cleaning device and the exhaust portion of the engine can be connected easily and appropriately. Accordingly, the ease with which the exhaust cleaning device is assembled can be further improved while using a simple configuration of simply including an elongated hole serving as the first adjustment portion and an elongated hole serving as the second adjustment portion.

With the above configuration, it is preferable that the first part has two first coupling portions, and the respective first coupling portions are disposed at positions that are separated from each other by a first set distance in a short-side direction of the exhaust cleaning device, in a state of being shifted by a second set distance in the lengthwise direction of the exhaust cleaning device such that the first coupling portions do not overlap in a one-directional view in the short-side direction, the second part has two second coupling portions, and the respective second coupling portions are disposed at positions that are separated from each other by a third set distance in the short-side direction of the exhaust cleaning device, in a state of being shifted by a fourth set distance in the lengthwise direction of the exhaust cleaning device such that the second coupling portions do not overlap in a one-directional view that is the same as that in the case of the first coupling portions in the short-side direction, the third part has two first coupled portions and has two second coupled portions, and similarly to the two first coupling portions, the first coupled portions are disposed at positions that are separated from each other by the first set distance in the short-side direction of the exhaust cleaning device, in a state of being shifted by the second set distance in the lengthwise direction of the exhaust cleaning device such that the first coupled portions do not overlap in a one-directional view in the short-side direction of the exhaust cleaning device, and similarly to the two second coupling portions, the second coupled portions are disposed at positions that are separated from each other by the third set distance in the short-side direction of the exhaust cleaning device, in a state of being shifted by the fourth set distance in the lengthwise direction of the exhaust cleaning device such that the second coupled portions do not overlap in a one-directional view in the short-side direction of the exhaust cleaning device, and the elongated holes are formed in the two first coupling portions and the two second coupling portions, and screw portions are included in each of the two first coupled portions and the two second coupled portions.

According to the above-described configuration, bolting the corresponding first coupling portions of the first part and the first coupled portions of the third part and bolting the corresponding second coupling portions of the second part and the second coupled portions of the third part can be performed from one side in the short-side direction of the exhaust cleaning device. Also, by including screw portions that enable bolting with the first coupling portions of the first part and screw portions that enable bolting with the second coupling portions of the second part respectively on the first coupled portions and the second coupled portions of the third part coupled to the engine, it is easier to perform an operation of bolting the first part and the second part to the third part from one side in the short-side direction of the exhaust cleaning device. Accordingly, the ease with which the exhaust cleaning device is assembled can be further improved.

With the above configuration, it is preferable that the first part has a coupling portion that detachably bolts to a coupled portion included on the engine, and a first coupling portion that detachably bolts to a first coupled portion included on the third part, the second part has a second coupling portion that detachably bolts to a second coupled portion provided on the first part, the first adjustment portion is constituted by an elongated hole formed so as to be longer in a direction along the lengthwise direction of the exhaust cleaning device, the elongated hole being formed in at least one pair among the coupling portion and the first coupling portion, and the coupled portion and the first coupled portion, and the second adjustment portion is constituted by an elongated hole formed so as to be longer in a direction along the lengthwise direction of the exhaust cleaning device, the elongated hole being formed in at least one of the second coupling portion and the second coupled portion.

According to this aspect, with a simple configuration of merely including an elongated hole serving as the first adjustment portion and an elongated hole serving as the second adjustment portion, the ease with which the exhaust cleaning device is assembled can be further improved.

With the above configuration, the second adjustment portion enables adjustment of the position of the second part in the short-side direction of the elongated hole with respect to the engine, due to the length in the short-side direction of the elongated hole being larger than a bolt diameter, the first part includes a third coupling portion that bolts to a third coupled portion extending from one end side in the lengthwise direction of the exhaust cleaning device toward the first part, a coupling hole is formed in at least one of the third coupling portion and the third coupled portion, the coupling hole having a length in a direction that is the same as the short-side direction of the elongated hole in the second adjustment portion that is larger than the bolt diameter, and the coupling hole constitutes a third adjustment portion configured to enable adjustment of the position of the third coupled portion in the short-side direction of the elongated hole with respect to the engine.

According to this aspect, in the exhaust cleaning device, even if individual differences relating to the positional relationship in the short-side direction of the elongated hole, which is perpendicular to the lengthwise direction of the exhaust cleaning device, between the suction portion and the portions coupled to the support frame, and the like occur, the respective positions of the first part and the second part of the support frame that couple to the exhaust cleaning device can be adjusted in the short-side direction of the elongated holes in response to the individual differences. Accordingly, regardless of individual differences in the lengthwise direction of the exhaust cleaning device and in the short-side direction of the elongated holes that is perpendicular to the lengthwise direction, and the like, the exhaust cleaning device can be easily equipped in a fixed manner at an appropriate position with respect to the engine, and the suction portion of the exhaust gas cleaning device and the exhaust portion of the engine can be connected easily and appropriately.

Accordingly, the ease with which the exhaust cleaning device is assembled can be further improved while using a simple configuration of simply including an elongated hole serving as the second adjustment portion and a coupling hole serving as the third adjustment portion.

With the above configuration, it is preferable that the two third coupled portions are arranged at positions that are separated from each other by a first set distance in the short-side direction of the exhaust cleaning device, in a state in which, so as to not overlap each other in a one-directional view in the short-side direction, the two third coupled portions are shifted by a second set distance in a short-side direction perpendicular to the short-side direction, the two second coupling portions are disposed at positions that are separated from each other by a third set distance in the short-side direction of the exhaust cleaning device, in a state of being shifted by a fourth set distance in the lengthwise direction of the exhaust cleaning device such that the two second coupling portions do not overlap each other in the same one-directional view in the short-side direction as in the case of the first coupling portion, similarly to the two third coupled portions, the two third coupling portions are arranged at positions that are separated from each other by the first set distance in the short-side direction of the exhaust cleaning device, in a state in which, so as to not overlap each other in a one-directional view in the short-side direction, the two third coupling portions are shifted by the second set distance in a short-side direction perpendicular to the short-side direction, and similarly to the two second coupling portions, the two second coupled portions are disposed at positions that are separated from each other by the third set distance in the short-side direction of the exhaust cleaning device, in a state of being shifted by the fourth set distance in the lengthwise direction of the exhaust cleaning device such that the two second coupled portions do not overlap each other in a one-directional view in the short-side direction, and the elongated holes are formed in the first coupling portion and the two second coupling portions, and screw portions are included in each of the first coupled portion and the two second coupled portions.

According to this aspect, bolting the corresponding third coupled portions of the exhaust cleaning device and the third coupling portions of the first part and bolting the corresponding second coupled portions of the first part and the second coupling portions of the second part can be performed from one side in the short-side direction of the exhaust cleaning device. Also, by including a screw portion that enables bolting with the first coupling portion of the first part at the first coupled portion of the third part coupled to the engine, and including screw portions that enable bolting with the second coupling portions of the second part at the second coupled portions of the first part that couple to the engine and the third part, it is easier to perform an operation of bolting the first part to the third part and an operation of bolting the second part to the first part from one side in the short-side direction of the exhaust cleaning device. Accordingly, the ease with which the exhaust cleaning device is assembled can be further improved.

BRIEF DESCRIPTION OF THE DRAWINGS

FIG. 16A is a perspective view showing a supporting structure for an engine control unit having a power steering mechanism.

FIG. 16B is an exploded perspective view showing a supporting structure for the engine control unit having the power steering mechanism.

FIG. 17A is a perspective view showing a supporting structure for an engine control unit without a power steering mechanism.

FIG. 17B is an exploded perspective view (b) showing the supporting structure for the engine control unit without the power steering mechanism.

DETAILED DESCRIPTION

Hereinafter, preferred embodiments in which the present invention is applied to a tractor, which is an example of a working vehicle, will be described as an example of a mode for carrying out the invention with reference to the drawings.

Figure 1:
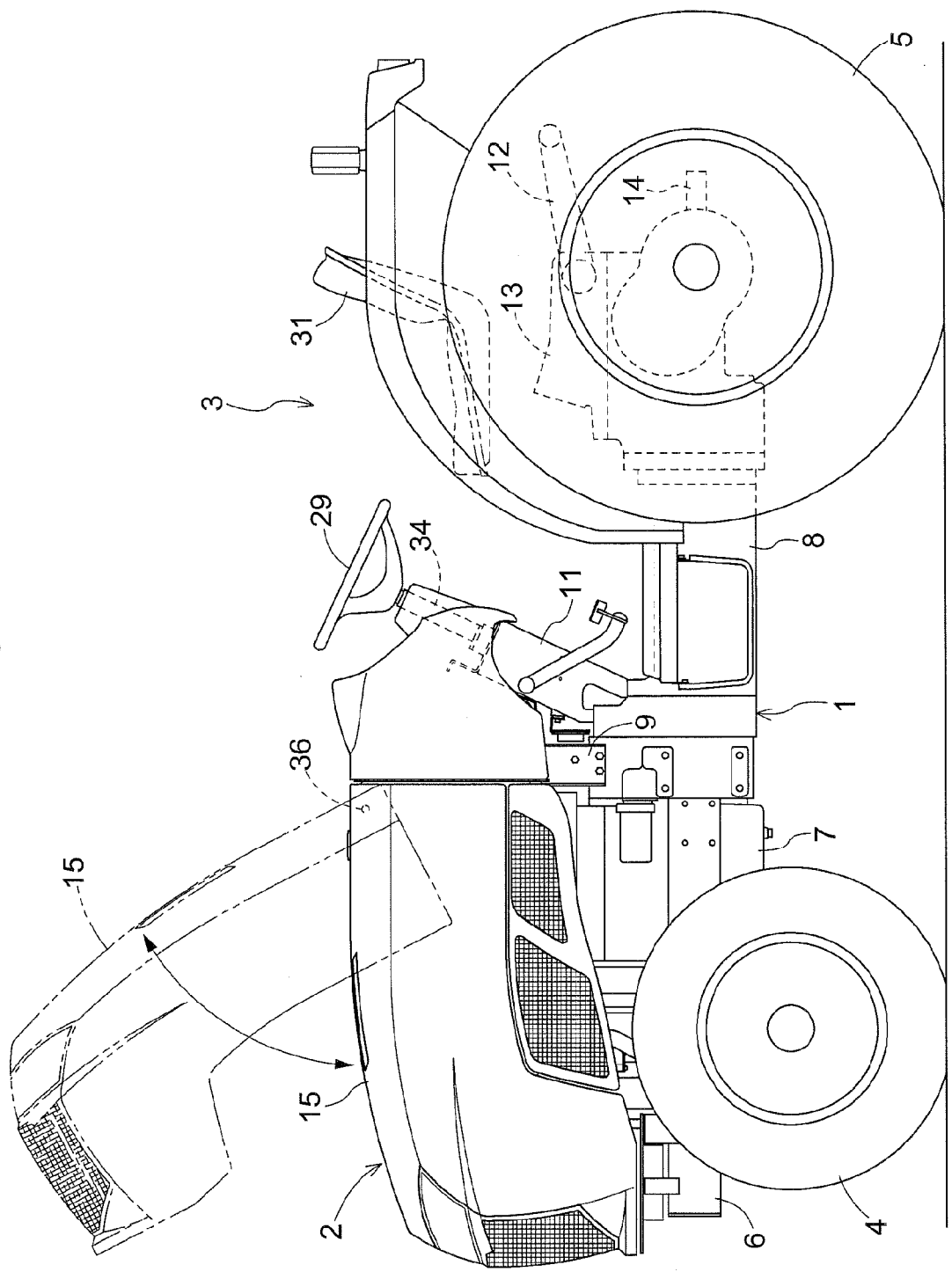
FIG. 1 is a left-side view of a tractor.

As shown in FIG. 1, a tractor illustrated in the present embodiment includes an engine portion 2 on the front half of a vehicle body frame 1, and a boarding/driving portion 3 on the rear half of the vehicle body frame 1. Also, the tractor is constituted as a four-wheel drive tractor by disposing front wheels 4 serving as steered wheels that can be driven on the left and right of the engine portion 2, and disposing rear wheels 5 serving as driven wheels that can be controlled on the left and right of the boarding/driving portion 3.

Figure 2:
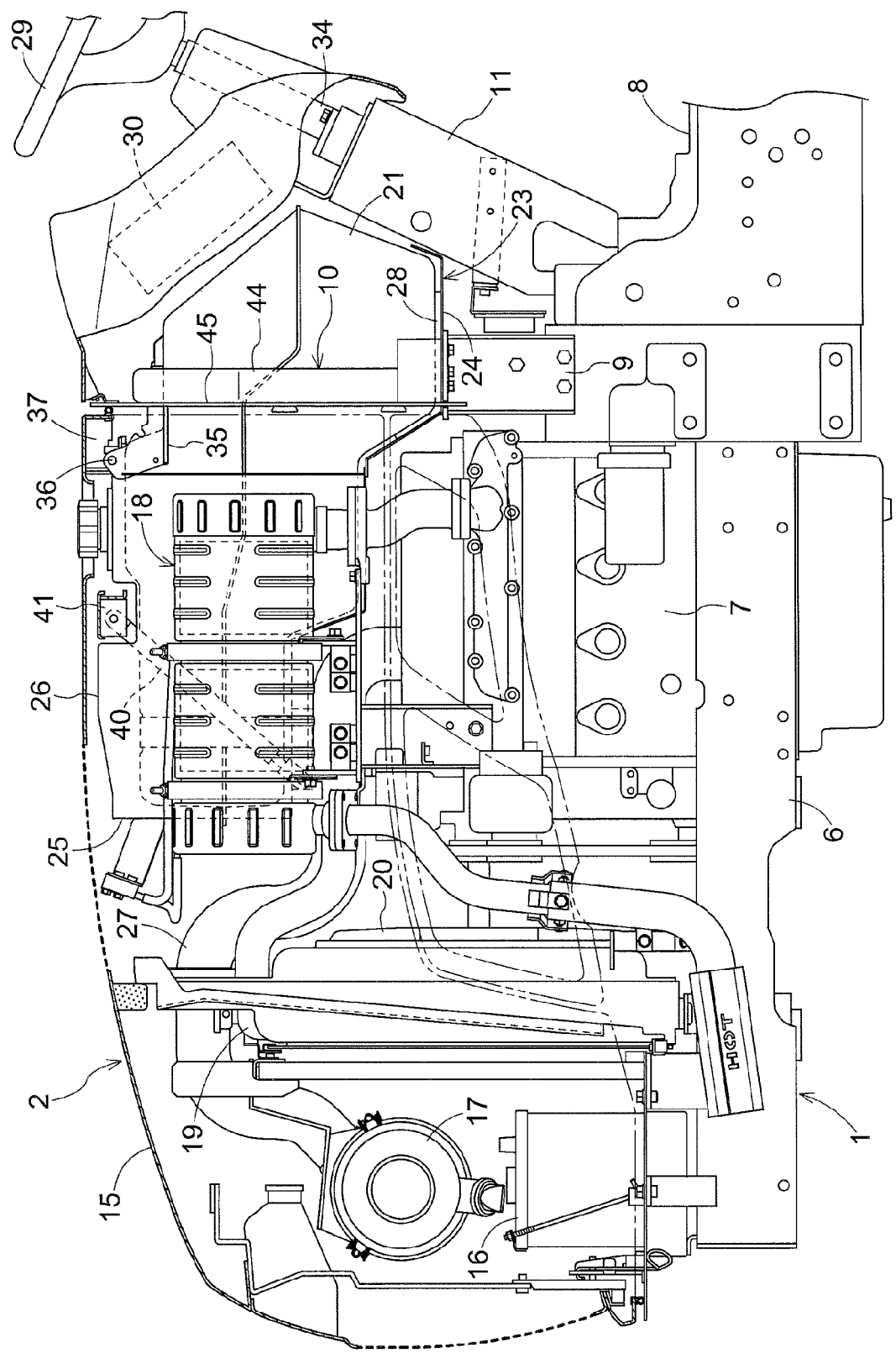
FIG. 2 is a left-side view of a vertical cross-section of an engine portion.

As shown in FIGS. 1 and 2, the vehicle body frame 1 is constituted by coupling a water-cooled vertical diesel engine (referred to below as "engine") 7 including a common rail system (not shown) on the rear portion of a front portion frame 6 that forms the front half of the vehicle body frame 1, and by coupling a housing unit 8 that forms the rear half of the vehicle body frame 1 to the lower portion of the engine 7. Also, a partitioning member 9 that partitions the engine portion 2 and the boarding/driving portion 3 is provided in a standing manner on the front end portion of the housing unit 8, and a hood support member 10 that has an inverse U-shape in front view is provided in a standing manner on the upper end of the partitioning member 9. Also, a steering frame 11 that is approximately U-shaped in a view in the front-rear direction is provided in a standing manner in a rearwardly-inclined orientation at a location rearward of the partitioning member 9 on the housing unit 8.

As shown in FIG. 1, the rear portion of the housing unit 8 is equipped with left and right lift arms 12 that enable a vertical movement operation of a working apparatus (not shown) such as a rotary tiller apparatus or a plough that is coupled to the rear portion of the tractor, a hydraulic lift cylinder 13 configured to drive the left and right lift arms 12 so as to swing them in the up-down direction, and a PTO shaft 14 that enables work power for a working apparatus to be drawn in the case where a driven working apparatus such as a rotary tiller apparatus is coupled to the rear portion of the tractor, and the like. Also, a travel transmission system configured to transmit power from the engine 7 to the left and right front wheels 4 and the left and right rear wheels 5 for use in travel, a work transmission system configured to transmit power from the engine 7 to the PTO shaft 14 for use in work, and the like are provided in the housing unit 8.

Figure 3:
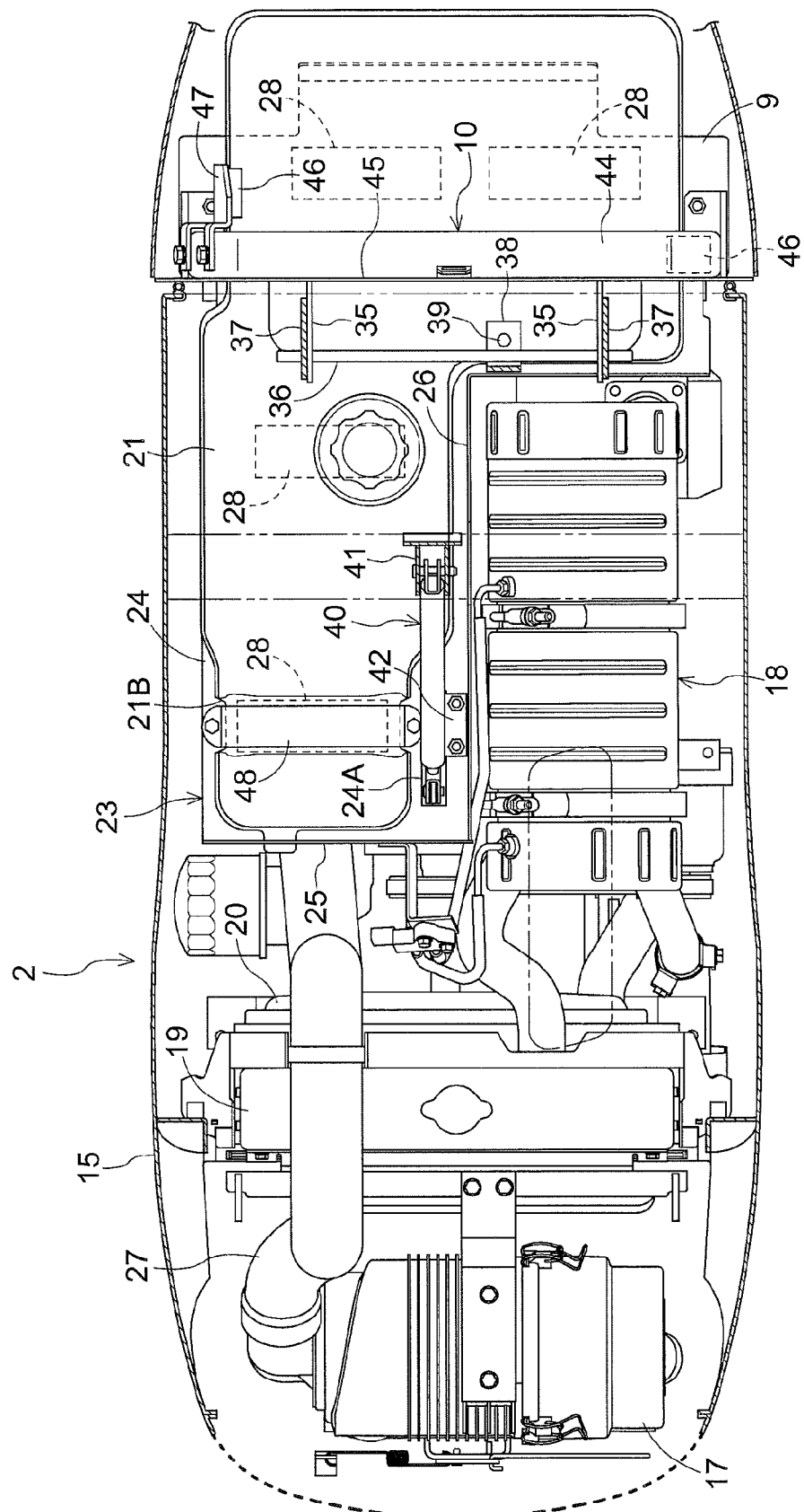
FIG. 3 is a plan view of a lateral cross-section of the engine portion.
Figure 4:
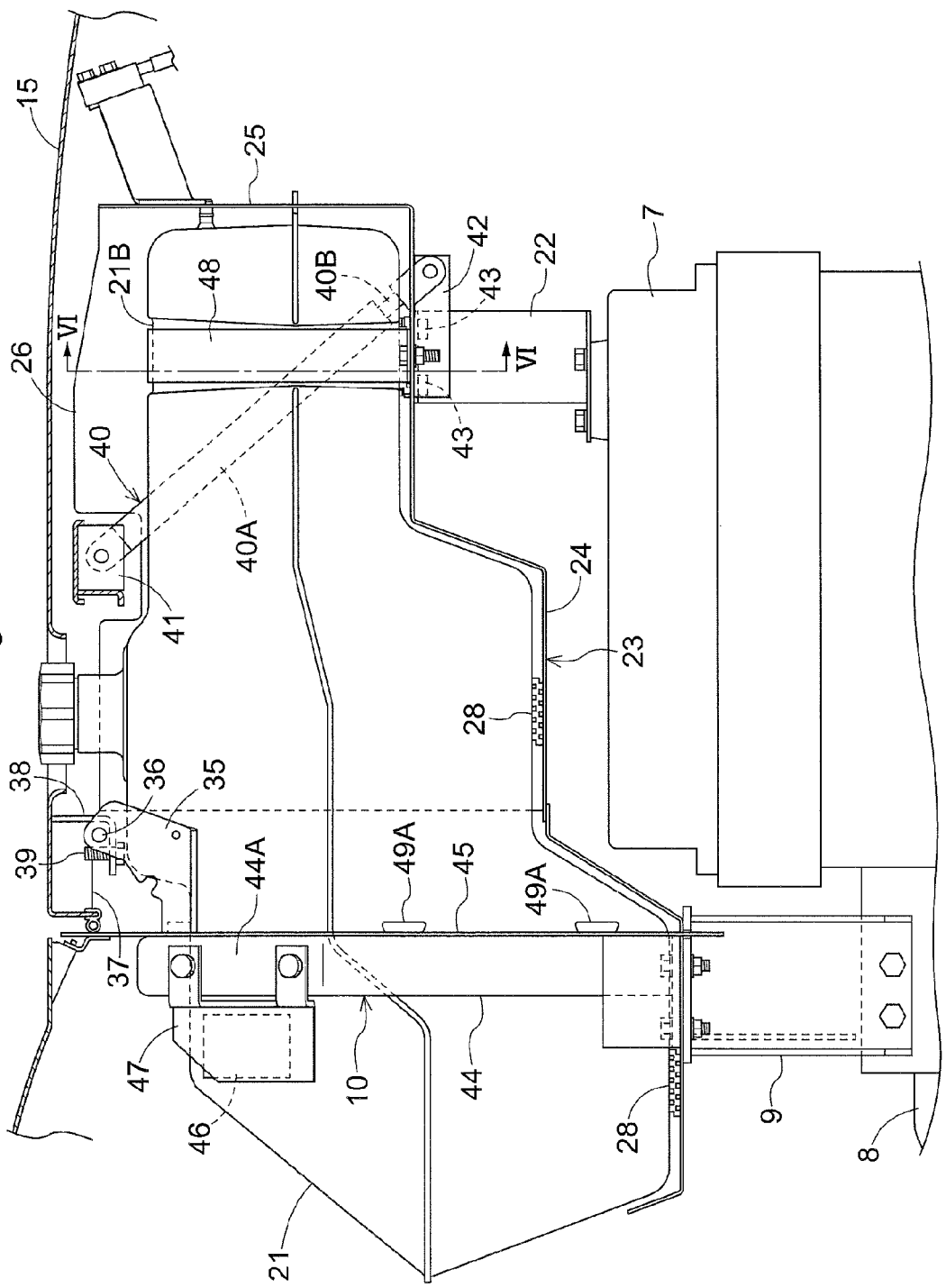
FIG. 4 is a right-side view of a vertical cross-section showing relevant portions of a holding structure for a fuel tank.
Figure 5:
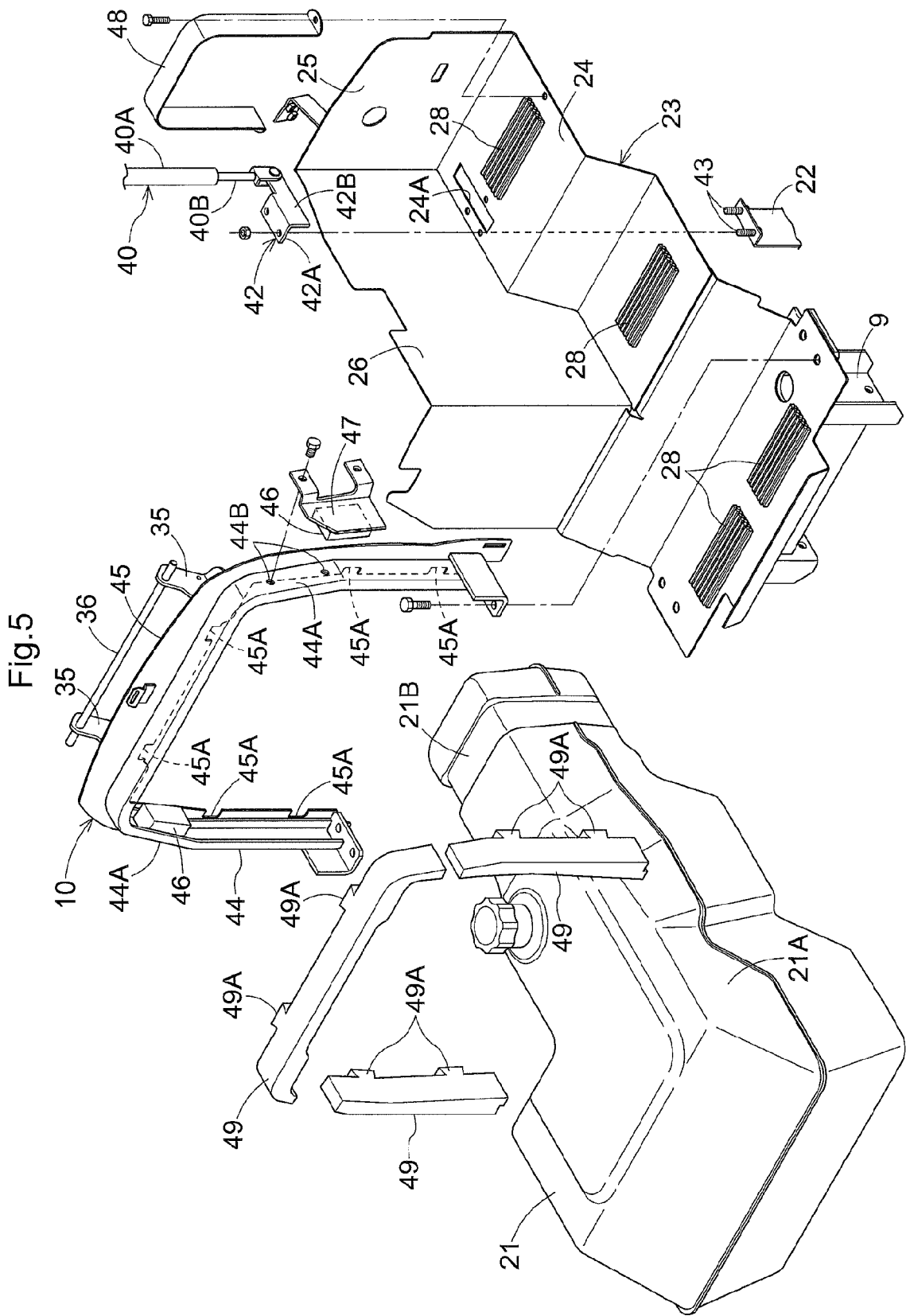
FIG. 5 is an exploded perspective view showing relevant portions of the holding structure for the fuel tank.
Figure 6:
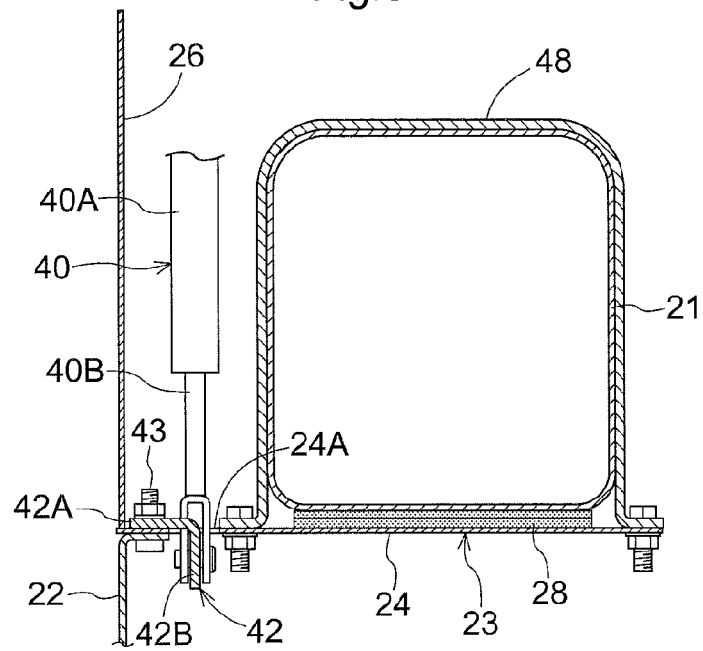
FIG. 6 is a cross-sectional view along arrow VI-VI in FIG. 4 showing a holding structure for the front portion side of the fuel tank.
Figure 7:
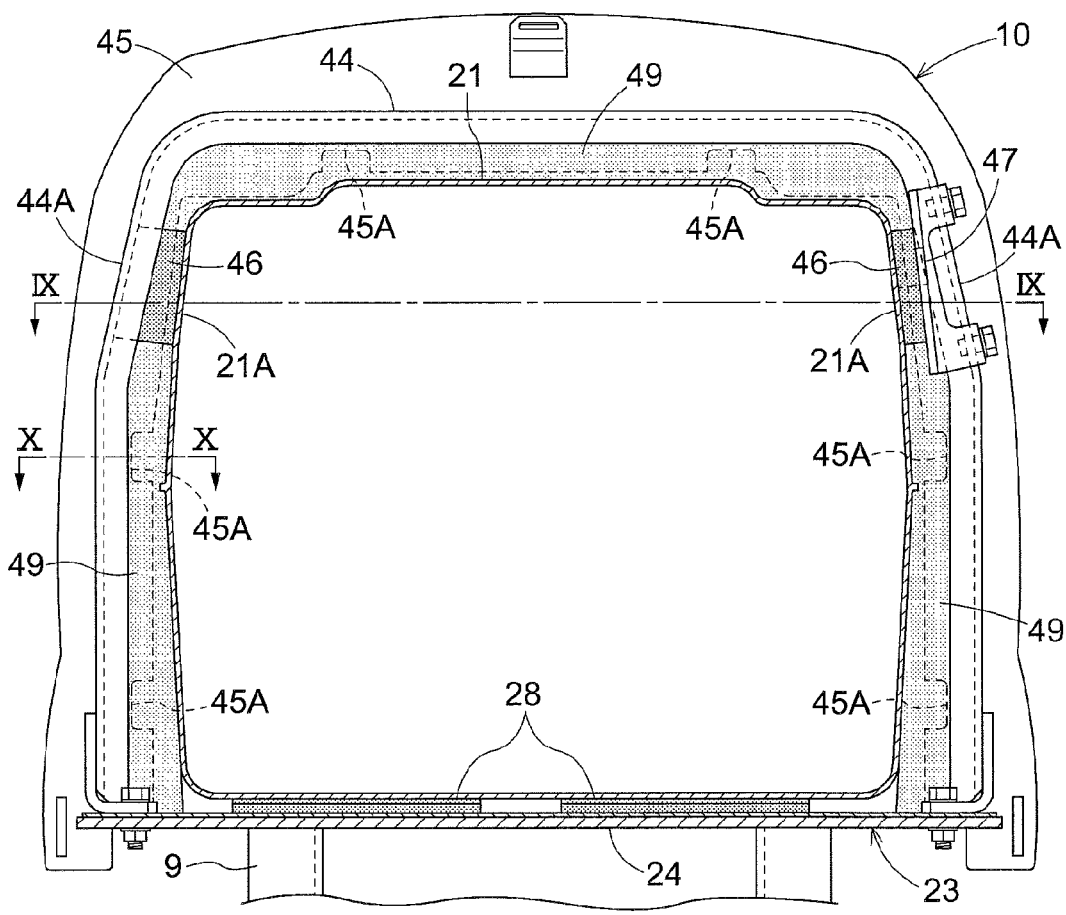
FIG. 7 is a rear view of a vertical cross-section showing relevant portions of a holding structure for the rear portion side of the fuel tank.
Figure 8:
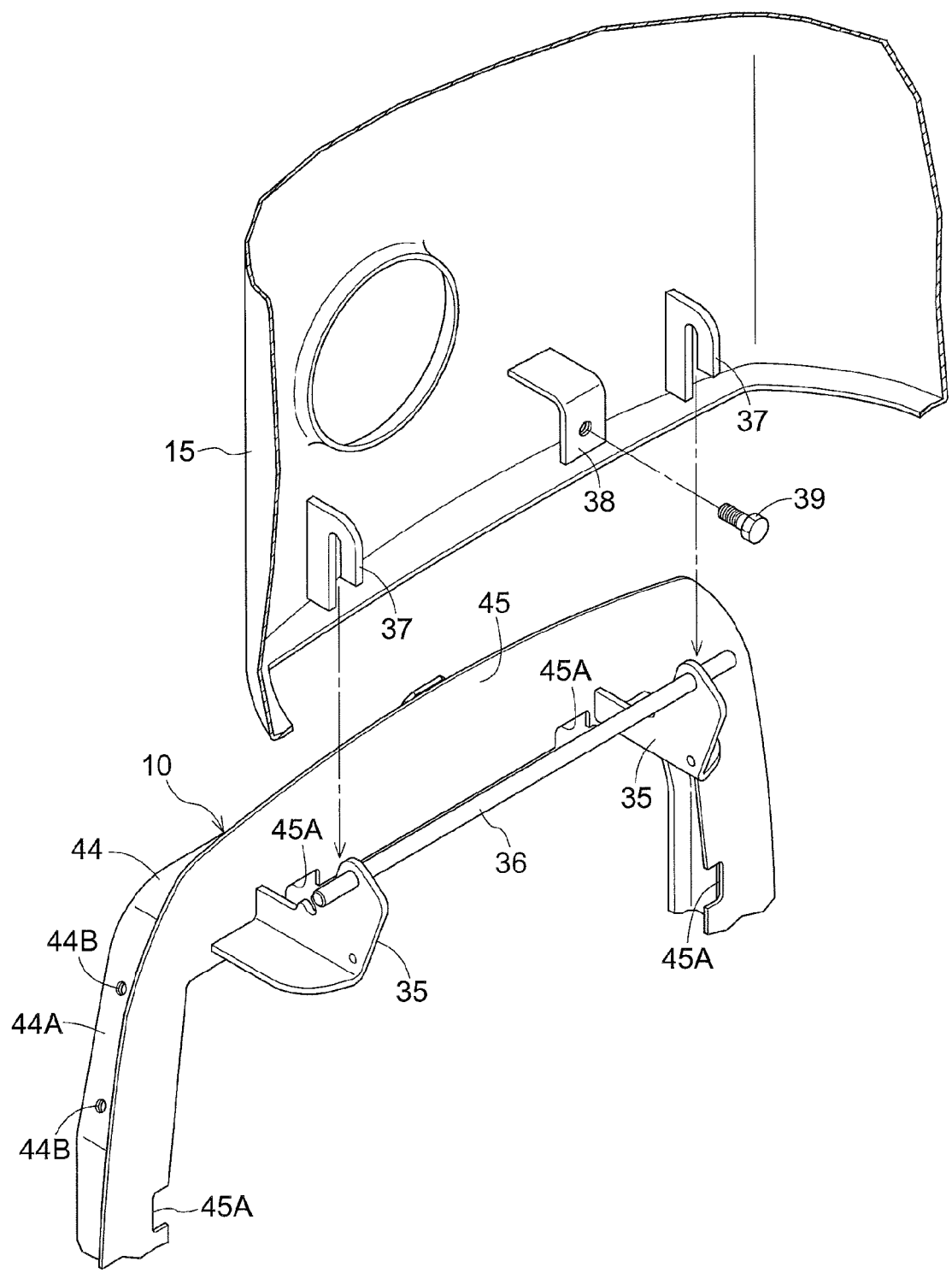
FIG. 8 is an exploded perspective view showing relevant portions of a retaining structure for a hood.
Figure 9:
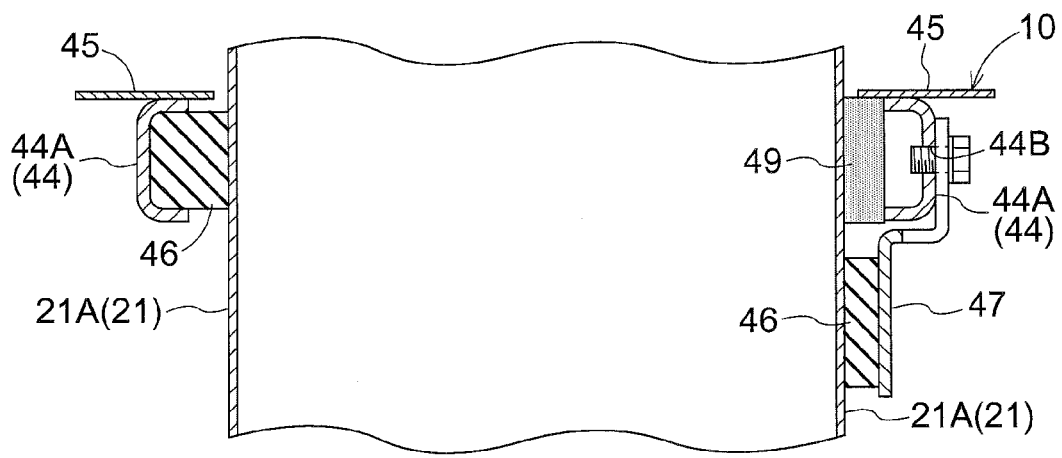
FIG. 9 is a cross-sectional view along arrow IX-IX in FIG. 7 showing a holding structure for the rear portion side of the fuel tank.
Figure 10:
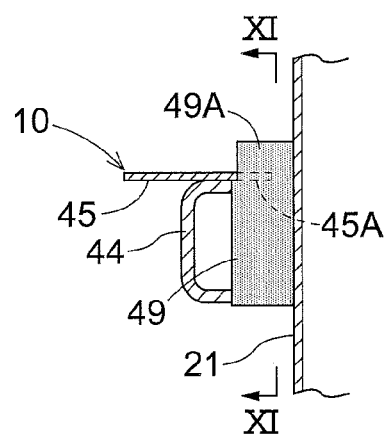
FIG. 10 is a cross-sectional view along arrow X-X in FIG. 7, showing a structure for attaching a sealing member between a hood support member and the fuel tank.
Figure 11:
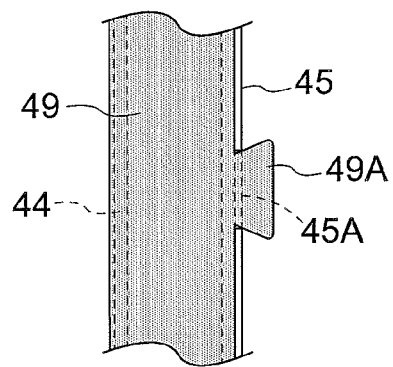
FIG. 11 is a cross-sectional view along arrow XI-XI in FIG. 10, showing a structure for attaching a sealing member between the hood support member and the fuel tank.

As shown in FIGS. 2 and 3, the engine portion 2 is constituted by disposing the engine 7, a battery 16, an air cleaner 17, a cylindrical exhaust cleaning device 18, a radiator 19, a cooling fan 20, a fuel tank 21 that is L-shaped in plan view, and the like, in an engine room formed by the partitioning member 9, a hood 15, and the like. The engine 7 is disposed on the lower side of the rear half of the engine room in an orientation in which the output shaft (not shown) is oriented in the front-rear direction. The battery 16 and the air cleaner 17 are disposed in the front end portion of the engine room. The exhaust cleaning device 18 is disposed at a location above the left half of the engine 7 in the rear half of the engine room, in an orientation in which the lengthwise direction thereof extends in the front-rear direction of the vehicle body. The radiator 19 and the cooling fan 20 are disposed between the engine 7 in the rear half and the battery 16 and the air cleaner 17 in the front end portion. The fuel tank 21 is disposed such that the narrow front portion thereof is located above the right half of the engine 7, and the wide rear portion thereof is located above the partitioning member 9.

As shown in FIGS. 2 to 7, a support member 22 is provided in a standing manner on the upper end of the front end portion of the engine 7. Also, a tank support member 23 that receives and supports the fuel tank 21 from below is installed so as to span from the upper end of the support member 22 to the upper end of the partitioning member 9. The tank support member 23 is configured such that a front blocking panel 25 that opposes the front end surface of the fuel tank 21 and a side blocking panel 26 that is L-shaped in plan view and partitions the fuel tank 21 from the exhaust cleaning device 18 are equipped in a standing manner on a bottom blocking panel 24 that is L-shaped in plan view and partitions the fuel tank 21 from the engine 7 from the support member 22 to the partitioning member 9, and thus a space that is thermally insulated with respect to the engine 7 and the exhaust cleaning device 18 is formed between the tank support member 23 and the hood 15. In other words, the tank support member 23 is constituted using the heat blocking panels 24 to 26 that form the thermally insulated space.

By forming the bottom blocking panel 24 in a stepwise shape that rises in front from the upper end of the partitioning member 9 to the upper end of the support member 22, a region in which the engine 7 is arranged, a piping region for a suction pipe 27 from the air cleaner 17 to the engine 7, and the like are ensured below the bottom blocking panel 24. By forming the bottom of the fuel tank 21 in a stepwise shape that conforms to the bottom blocking panel 24, it is easier to position it in the front-rear direction with respect to the bottom blocking panel 24 while the capacity thereof is increased. Also, multiple plate-shaped rubber vibration insulators 28 are provided between the upper surface of the bottom blocking panel 24 and the bottom surface of the fuel tank 21.

As shown in FIGS. 1 and 2, the boarding/driving portion 3 includes a steering wheel 29, a meter panel 30, a driving seat 31, and the like. The steering wheel 29 is linked to the left and right front wheels 4 via a steering shaft, a fully hydraulic power steering mechanism, and the like that are not shown in the drawings. The steering shaft is rotatably equipped by insertion into a steering post 34 that is provided in a standing manner on the upper end of the steering frame 11 in a rearward-inclined orientation that is the same as that of the steering frame 11. The meter panel 30 is disposed in a forward-inclined orientation at a position above the steering frame 11 and forward of the steering post 34.

As shown in FIGS. 1 to 5 and FIG. 8, the hood support member 10 includes left and right brackets 35 that extend upward and forward from the upper end portion of the hood support member 10. Also, a support shaft 36 in a left-right orientation is provided across the extended ends of the brackets 35. Meanwhile, left and right metal hooks 37 are disposed so as to be distributed at locations on both the left and right end sides on the interior surface of the rear end portion of the top sheet of the hood 15 in a state in which the rear end sides of the metal hooks 37 are the open sides. Also, an L-shaped engagement fixture 38 is provided at a location that is central in the left-right direction on the interior surface of the rear end portion of the top sheet of the hood 15, in a state in which the rear end sides thereof are the open sides. Also, on the rear end side of the engagement fixture 38, a retaining bolt 39 that holds the support shaft 36 between the hood 15 and the engagement fixture clasp 38 such that it is retained is detachably equipped by screwing, and accordingly, this configuration prevents separation of the metal hooks 37 from the support shaft 36.

With this configuration, after the left and right metal hooks 37 and the engagement fixture 38 included on the hood 15 engage with the support shaft 36 in the left-right orientation that is included on the hood support member 10, the support shaft 36 is retained using the retaining bolt 39, and thereby the hood 15 can be attached easily and reliably to the hood support member 10 in a state in which it is possible to perform opening and closing operations by means of swinging up and down using the support shaft 36 in the left-right orientation as a pivot point. Also, by canceling the retaining of the support shaft 36 by the retaining bolt 39, it is possible to easily remove the hood 15 from the hood support member 10.

Accordingly, it is possible to easily attach or remove the hood 15 with respect to the hood support member 10 and to achieve a simpler configuration, in comparison to the case where, for example, a screw portion that allows attachment and removal of the retaining bolt 39 is provided on each of the left and right metal hooks 37.

As shown in FIGS. 2 to 6, the hood 15 is biased so as to swing in the opening direction by a hood damper 40 disposed between the fuel tank 21 and the side blocking panel 26 of the tank support member 23. Also, it is possible to hold the hood 15 such that it is fixed in a closed orientation against the biasing of the hood damper 40, by means of a lock mechanism that is not shown.

Incidentally, if the opening angle of the hood 15 is set to be wide in order to make it easier to perform maintenance on the engine portion 2, it is necessary to use a hood damper 40 whose overall length at the time of contraction is longer due to the extension stroke being long. Also, due to the fact that the hood damper 40 is susceptible to heat, it is desirable that the hood damper 40 is disposed in the thermally insulated space formed by the hood 15 in the closed orientation and the tank support member 23, thus making it less susceptible to heat emitted from the engine 7 and the exhaust cleaning device 18.

However, due to the fact that the thermally insulated space is a small region that does not include the piping region for the exhaust cleaning device 18, the piping region for the suction pipe 27, and the like in the limited region behind the cooling fan 20 and above the engine 7 in the engine room formed from the hood 15 and the like whose height is limited in order to ensure visibility, if the overall length of the hood damper 40 at the time of contraction is too long, the entirety thereof cannot be stored.

In view of this, in the tractor, an opening 24A for insertion of the damper is formed in the front end portion of the bottom blocking panel 24 in the tank support member 23. Also, the end portion on the cylinder tube side of the hood damper 40 is pivotably coupled to a damper first coupling member 41 provided at the location that is central in the left-right direction of the internal surface of the hood 15. Also, a damper second coupling member 42 that couples to the above-mentioned support member 22 is pivotably coupled to the end portion on the piston rod side of the hood damper 40.

The second coupling member 42 includes a hanging portion 42B that hangs from the right end of a coupling portion 42A that couples to the upper end of the support material 22 in a horizontal orientation, and the front end side of the hanging portion 42B is used as a pivoting portion for damper pivoting. The coupling member 42A is configured to, in a state of being placed on the upper end of the support material 22, be detachably bolted thereto together with the bottom blocking panel 24 of the tank support member 23, using front and rear stud bolts 43 provided in a standing manner on the upper end of the support member 22. The hanging portion 42B is formed such that, when the coupling portion 42A is in a state of being coupled to the support material 22, the hanging portion 42B enters the opening 24A of the bottom blocking panel 24 and the pivoting portion is located below the bottom blocking panel 24.

With this configuration, by pivotably coupling the end portion on the cylinder tube side of the hood damper 40 to the first coupling member 41 of the hood 15 and placing the second coupling member 42 that is pivotably coupled to the end portion on the piston rod side of the hood damper 40 on the upper end of the support material 22 along with the bottom blocking panel 24 of the tank support member 23 and bolting them together, when the end portion on the piston rod side of the hood damper 40 and the pivoting portion of the second coupling member 42 are in a state of being located at a predetermined position outside of the thermally insulated space below the bottom blocking panel 24, a large portion on the cylinder tube side of the piston rod 40B and the cylinder tube 40A of the hood damper 40 can be disposed in the narrow thermally insulated space between the hood 15 in the closed orientation and the tank support member 23.

That is to say, even when using a hood damper 40 whose overall length at the time of contraction is longer due to the extension stroke being longer due to increasing the opening angle of the hood 15 in order to make it easier to perform maintenance on the engine portion 2, it is possible to dispose at least the cylinder tube side of the hood damper 40 that is susceptible to heat in the thermally insulated space in a state in which the hood 15 is closed. According to this, it is possible to effectively reduce the influence that heat emitted from the engine 7 and the exhaust cleaning device 18 has on the hood damper 40.

Also, due to the fact that it is not necessary to attach the hood damper 40 to the second coupling member 42 that has been coupled to the support member 22 due to the second coupling member 42 that is pivotably coupled to the hood damper 40 being coupled to the support member 22, attachment of the hood damper 40 can be simplified.

Also, due to the fact that the opening 24A of the bottom blocking panel 24 does not need to be formed so as to be large in order to enable retrofitting of the hood damper 40, and moreover, that the piston rod side with a smaller outer circumference than the cylinder tube side of the hood damper 40 is coupled to the pivoting portion of the second coupling member 42, the opening 24A of the bottom blocking panel 24 can be made smaller than in the case where the cylinder tube side is coupled. According to this, it is possible to effectively suppress a case in which heat emitted from the engine 7 and the exhaust cleaning device 18 flows from the opening 24A of the bottom blocking panel 24 into the thermally insulated space, and the effect that heat emitted from the engine 7 and the exhaust cleaning device 18 has on the hood damper 40 and the like in the thermally insulated space can be effectively reduced.

Note that it is possible to use a gas damper, an oil damper, or the like as the hood damper 40.

As shown in FIGS. 2 to 7, the tank support member 23 is configured such that the rear end portion of the bottom blocking panel 24 extends rearward from the upper end of the partitioning member 9 and the rear end of the bottom blocking panel 24 is adjacent to the steering frame 11. Accordingly, the space between the hood support member 10 and the steering frame 11 and meter panel 30 can be used as a thermally insulated space in which the fuel tank 21 can be disposed.

The fuel tank 21 is formed such that the rear side thereof passes between the rear end portion of the bottom blocking panel 24 and the hood support member 10 and has a length in the front-rear direction that is adjacent to the steering frame 11 and the meter panel 30. Also, the rear side of the fuel tank 21 is formed in a shape in which the circumferential surface thereof is adjacent to the upper surface of the rear end portion of the bottom blocking panel 24 and the inner edge of the hood support member 10, and the lower side of the rear end surface thereof is furthermore in a rearwardly-inclined orientation adjacent to the steering frame 11, and the upper side of the rear end surface thereof is in a forwardly-inclined orientation adjacent to the meter panel 30.

That is to say, the space between the hood support member 10 and the steering frame 11 and meter panel 30 can be used effectively not only as a thermally insulated space in the engine room, but also as a space in which the fuel tank 21 is arranged. Also, by forming the fuel tank 21 into a shape according to which these spaces can be used effectively, it is possible to significantly increase the capacity of the fuel tank 21 without incurring an inconvenience such as visibility being reduced due to the position of the upper end of the hood 15 being raised.

As shown in FIGS. 2 to 7 and FIG. 9, the hood support member 10 includes, in a first member 44 composed of a groove-shaped steel material formed into an inverse U shape in a front view, a second member 45 made of sheet metal formed into an inverse U shape in a front view, left and right rubber members 46 that are elastic members 46 for holding the fuel tank, and the like. Also, the hood support member 10 is configured such that when it is provided in a standing manner on the partitioning member 9 in a state of spanning to the left and right of the fuel tank 21, the outer edge of the second member 45 is adjacent to the inner surface of the hood 15 in the closed orientation and the inner edge of the second member 45 is adjacent to the outer surface of the fuel tank 21. Also, the hood support member 10 is configured such that the left and right rubber members 46 act on the upper portion side of the fuel tank 21 to hold the rear portion side of the fuel tank 21 at a predetermined position on the bottom blocking panel of the tank support member 23.

The structure for holding the fuel tank 21 will be described next in detail. In the hood support member 10, the first member 44 includes, on the left and right upper end portions thereof, inclined portions 44A that oppose inward-facing inclined portions 21A provided at the left and right corner portions on the upper side of the rear portion of the fuel tank 21. Also, a left rubber member 46 is equipped in a fixed manner by adhesion or the like to the inner surface of the inclined portion 44A on the left side. Also, upper and lower screw portions 44B whose screw directions are the direction perpendicular to the right-side inwardly-facing inclined portion 21A (the far-near direction with respect to the fuel tank 21) are formed on the right-side inclined portion 44A, and a support panel 47 that is detachably bolted to the outer surface of the inclined portion 44A using the screw portions 44B are provided. Also, the right rubber member 46 is provided in a fixed manner by adhesion or the like to a surface opposing the inwardly-facing inclined portion 21A on the right side of the fuel tank 21 on the support panel 47.

On the other hand, the tank support member 23 includes, on the front portion side of the bottom blocking panel 24, a fixing band 48 having an inverse U shape that is detachably bolted to the bottom blocking panel 24 in a state of spanning left and right over the front portion side of the fuel tank 21. The fixing band 48 is configured to, in a state of being bolted to the bottom blocking panel 24, fit into a fixing band fitting groove portion 21B formed on the front portion side of the fuel tank 21. The groove portion 21B of the fuel tank 21 is formed such that it has a groove width that is slightly wider than the band width of the fixing band 48.

With the above-described configuration, after the fuel tank 21 is mounted on a predetermined location of the bottom blocking panel 24 in the tank support member 23, upon bolting the fixing band 48 to the bottom blocking panel 24, the fixing band 48 fits into the groove portion 21B of the fuel tank 21. Also, the elastic force of the rubber vibration insulator 28 included on the bottom blocking panel 24 acts from below on the bottom surface of the front portion side of the fuel tank 21.

Accordingly, the front portion side of the fuel tank 21 can be held between the rubber vibration insulator 28 on the bottom blocking panel 24 and the fixing band 48 in a state where positional shifting in the front-rear direction is prevented by engagement between the groove portion 21B of the fuel tank 21 and the fixing band 48.

Also, upon bolting the support panel 47 including the right rubber member 46 to the right-side inclined portion 44A of the first member 44 of the hood support member 10, the elastic force of the right rubber member 46 acts externally from above on the right side of the fuel tank 21 and on the right-side inwardly-facing inclined portion 21A of the fuel tank 21. Also, the elastic force of the left rubber member 46 acts externally from above on the left side of the fuel tank 21 and on the left-side inwardly-facing inclined portion 21A of the fuel tank 21. Furthermore, the elastic force of the rubber vibration insulator 28 included on the bottom blocking panel 24 acts from below on the bottom surface of the rear portion side of the fuel tank 21.

Accordingly, it is possible to hold the rear portion side of the fuel tank 21 between the rubber vibration insulator 28 on the bottom blocking panel 24 and the left and right rubber members 46 on the hood support member 10.

In other words, it is possible to also use the hood support member 10 as a holding member that holds the rear portion side of the fuel tank 21 at a predetermined position, and accordingly, it is possible to achieve simplicity in the configuration for assembling the fuel tank 21. Also, in addition to thus achieving simplicity in the configuration, by merely bolting the fixing band 48 to the bottom blocking panel 24 of the tank support member 23 and bolting the support panel 47 including the right rubber member 46 to the hood support member 10, it is possible to assemble the fuel tank 21 easily and reliably.

As shown in FIGS. 5, 7, and FIGS. 9 to 11, in the hood support member 10, two recessed portions 45A, which facilitate retrofitting of the sealing members 49 made of a sponge material that close the gap formed between the hood support member 10 and the fuel tank 21, are formed on the upper edge portion and the left and right edge portions of the inner circumferential side of the second member 45, in a state of having a predetermined interval therebetween in the lengthwise direction of the recessed portions 45A. There are three types of sealing members 49, namely upper-edge, left-edge, and right-edge, and latch portions 49A that enable latch-fitting from rearward with respect to the corresponding recessed portions 45A are formed so as to protrude from the front surfaces thereof.

Accordingly, in a state in which the fuel tank 21 is assembled with the hood support member 10 being provided in a standing manner on the partitioning member 9, the sealing members 49 can be assembled easily and reliably from rearward of the second member 45 with respect to the second member 45 of the hood support member 10 in a state in which the gap between the hood support member 10 and the fuel tank 21 is closed.

As shown in FIGS. 2, 3, and 12 to 14, the exhaust cleaning device 18 is provided with an oxidizing catalyst 50 and a DPF (diesel particulate filter) 51 on the central portion in the front-rear direction thereof. Also, the suction portion 18A is included at a site on the lower end of the rear end portion of the exhaust cleaning device 18, and the exhaust portion 18B is included at a site on the lower end of the front end portion of the exhaust cleaning device 18. Also, in order to enable exchanging and maintenance of these components, a rear end portion including the suction portion 18A, a rear portion side of an intermediate portion in the front-rear direction including the oxidizing catalyst 50, a front portion side of the intermediate portion in the front-rear direction including the DPF 51, a front end portion including the exhaust portion 18B, and the like are configured to be disassemblable.

The suction portion 18A of the exhaust cleaning device 18 is connected to the exhaust portion 52A of an exhaust manifold 52, which is the exhaust portion 7A of the engine 7 and is included on the upper-left portion of the engine 7. The connection between the suction portion 18A and the exhaust portion 52A is configured such that it is possible to be performed by bolting flanges 18C and 52B that are shaped into equilateral triangles and are included on the connecting ends of these components. The exhaust portion 18B of the exhaust cleaning device 18 is connected to one end portion of the exhaust pipe 53. The connection between the exhaust portion 18B and the exhaust pipe 52A is configured such that it can be performed by bolting flanges 18D and 53A that are square-shaped and are included on the connecting ends of these components.

The exhaust pipe 53 extends from the exhaust portion 18B of the exhaust cleaning device 18 toward a location on the left side of the front portion frame 6. Also, the exhaust pipe 53 is configured such that by inserting the extending end thereof into the rear end portion of the exhaust mixing pipe 54 that has a hexagonal cross-sectional shape and is bolted in a front-lowered orientation to the left side portion of the front portion frame 6 in a state where a gap exists between the inner circumferential surface of the rear end portion and the outer circumferential surface of the extending end, an ejector effect is obtained when exhaust from the engine 7 flows from the exhaust pipe 53 to the exhaust mixing pipe 54.

Accordingly, in the exhaust mixing pipe 54, external gas that flows from the gap between the exhaust pipe 53 and the exhaust mixing pipe 54 into the exhaust mixing pipe 54 can be mixed into the exhaust from the engine 7, and the exhaust temperature can be lowered.

Figure 12:
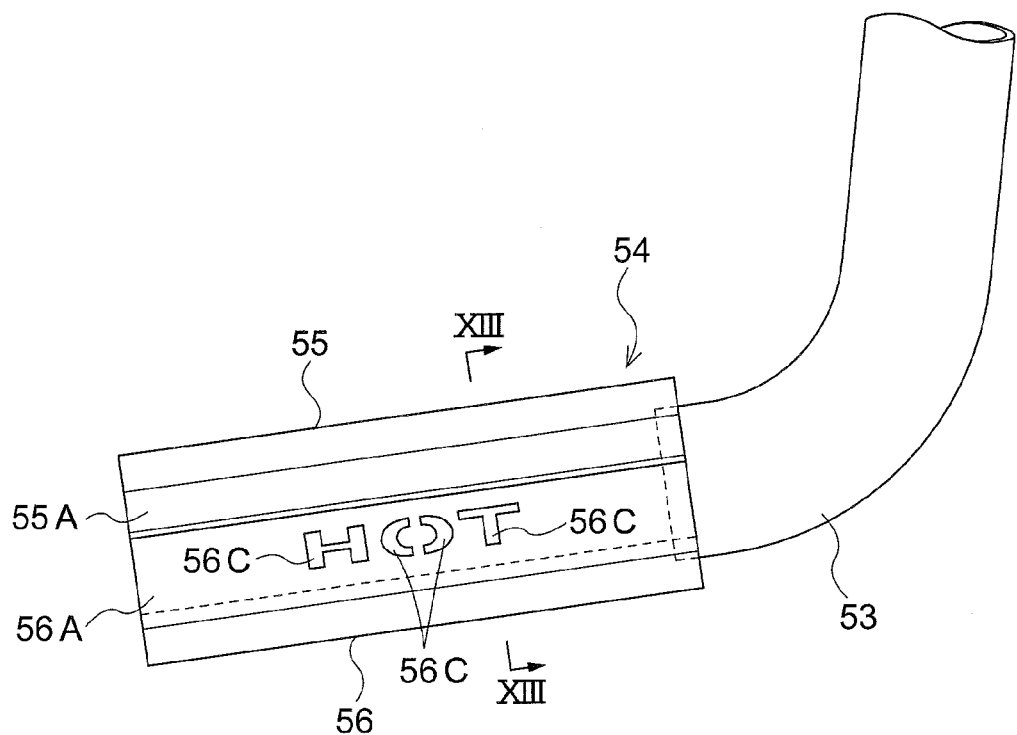
FIG. 12 is a left-side view of an exhaust mixing pipe.
Figure 13:
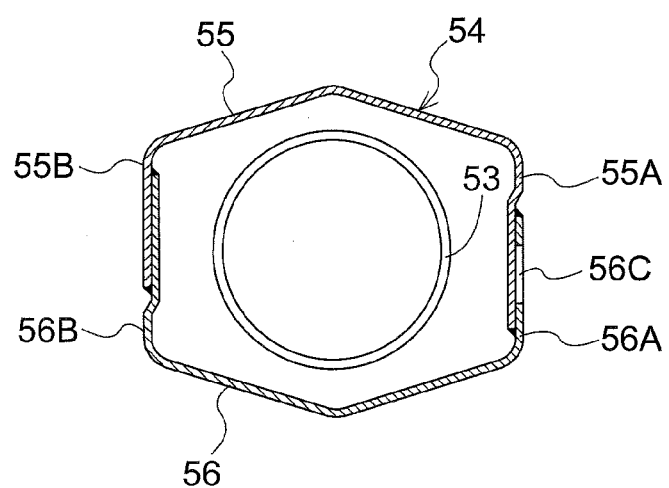
FIG. 13 is a cross-sectional view along arrow XIII-XIII in FIG. 12, showing the configuration of the exhaust mixing pipe.

As shown in FIGS. 2, 12, and 13, the exhaust mixing pipe 54 is constituted by welding an upper-side pipe member 55 and a lower-side pipe member 56 that are formed of a curve in the same shape. The upper-side pipe member 55 and the lower-side pipe member 56 include left and right side walls 55A and 55B, and 56A and 56B respectively. Also, the left side wall 55A of the upper-side pipe member 55 and the left side wall 56A of the lower-side pipe member 56 are superposed such that the left side wall 55A of the upper-side pipe member 55 forms an inner wall on the left side of the exhaust mixing pipe 54 and the left side wall 56A of the lower-side pipe member 56 forms an outer wall on the left side of the exhaust mixing pipe 54. Also, the right side wall 55B of the upper-side pipe member 55 and the right side wall 56B of the lower-side pipe member 56 are superposed such that the right side wall 55B of the upper-side pipe member 55 forms the outer wall on the right side of the exhaust mixing pipe 54 and the right side wall 56B of the lower-side pipe member 56 forms the inner wall on the right side of the exhaust mixing pipe 54. Also, letters "HOT", which indicate that the exhaust mixing pipe 54 has a high temperature, are formed on the left side wall 56A of the lower-side pipe member 56 by means of hole drilling.

Accordingly, it is possible to prevent the occurrence of an inconvenience in which exhaust flows out from letter holes 56C of the lower-side pipe member 56, and inscription of a high-temperature portion can be performed at a lower cost than with embossing.

Note that in addition to the above-described configuration, for example, in the exhaust mixing pipe 54, the letters "HOT", which indicate that the exhaust mixing pipe 54 has a high temperature, can be made even easier to recognize by making only the color of the surface on which the left side wall 56A of the lower-side pipe member 56 and the left side wall 55A of the upper-side pipe member 55 are superposed be different from the color of the other portions.

As shown in FIGS. 2, 3, 14, and 15, the exhaust cleaning device 18 is equipped by fitting a first band member 57 over the front end side, which is one end side in the lengthwise direction thereof. Also, the exhaust cleaning device 18 is equipped by fitting a second band member 58 over the rear end side, which is the other end side in the lengthwise direction thereof. On the other hand, the engine 7 includes a support frame 60 that supports the exhaust cleaning device 18 at a position on the upper left portion of the engine 7.

Figure 14:
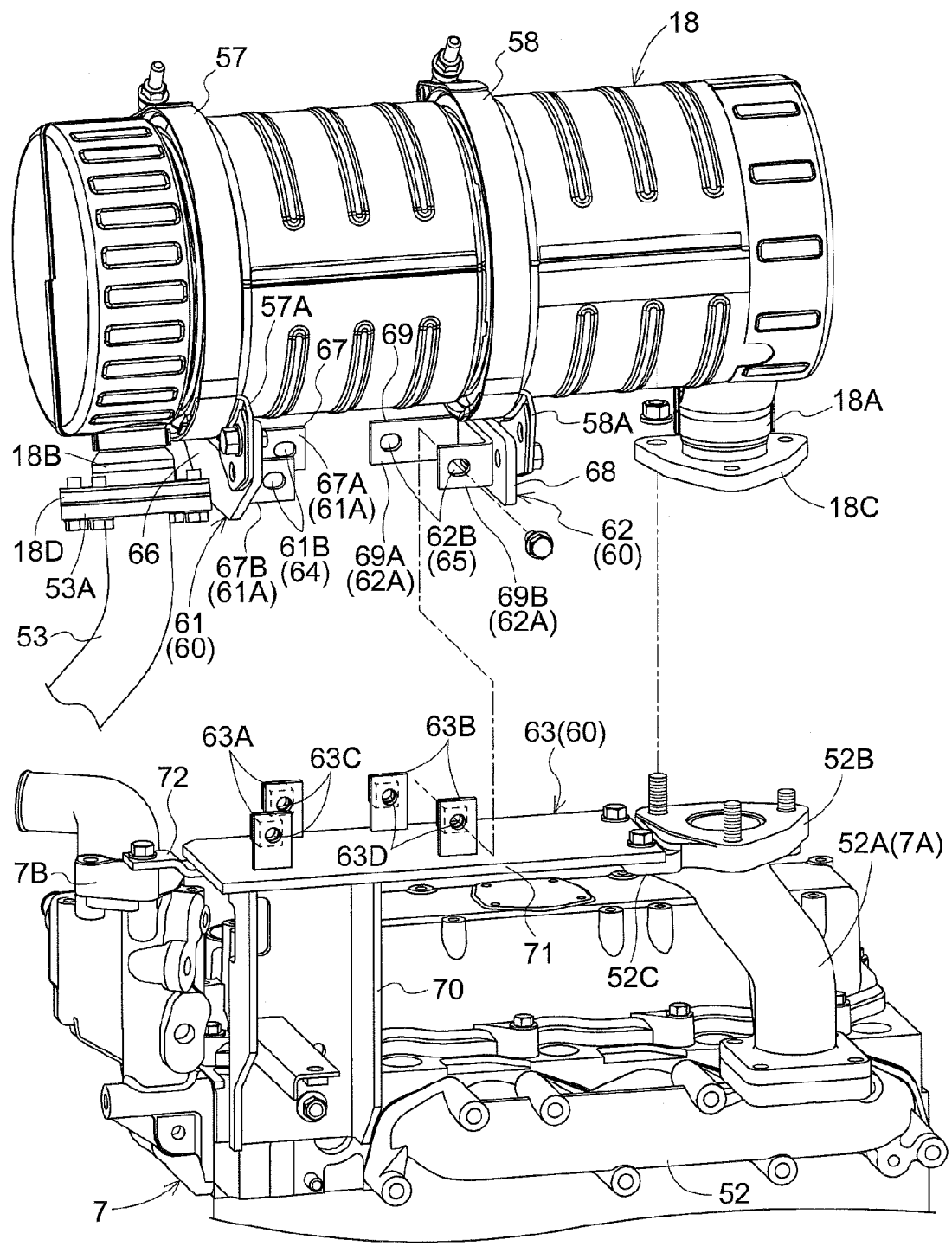
FIG. 14 is an exploded perspective view showing relevant portions of a supporting structure for an exhaust cleaning device.
Figure 15:
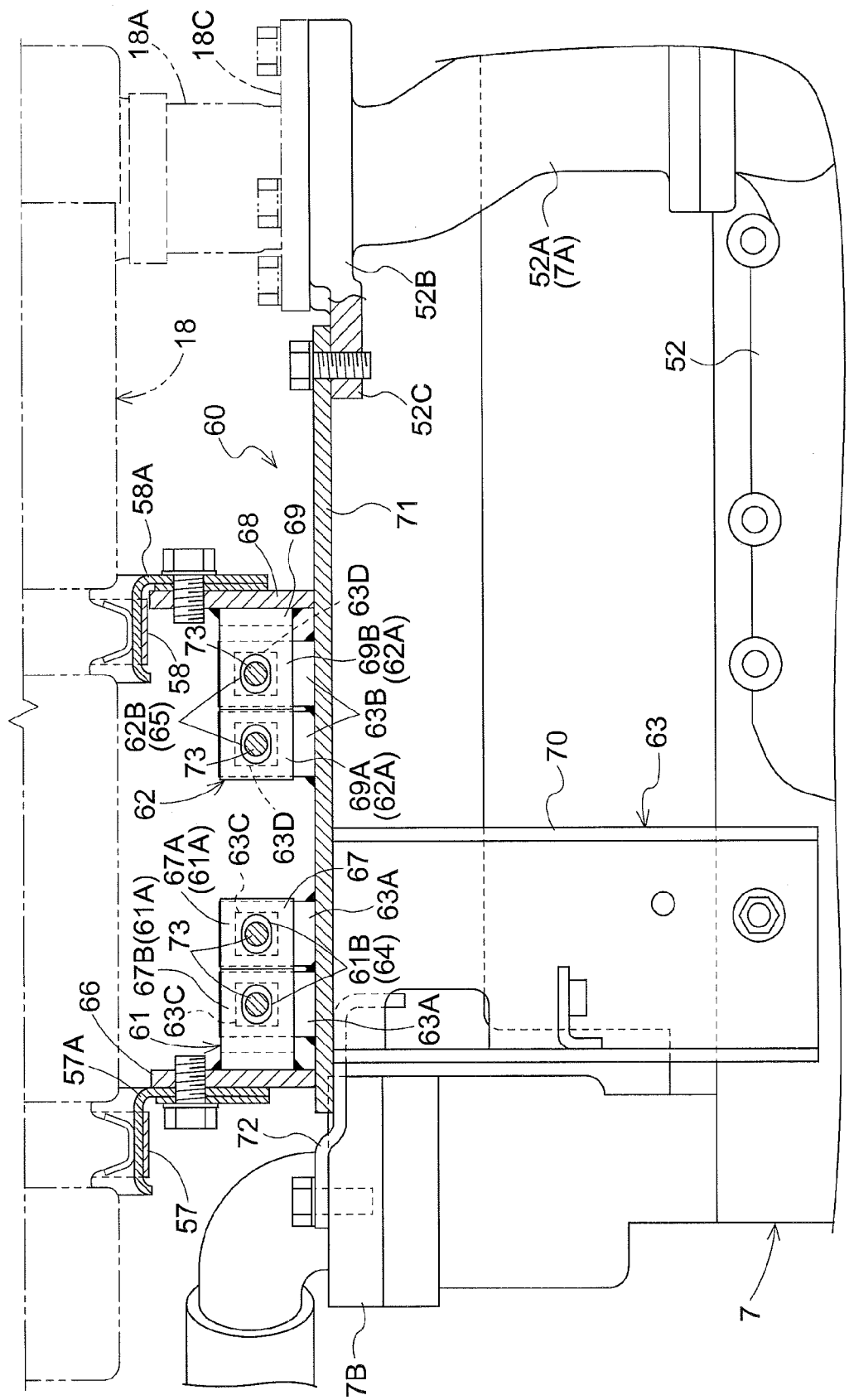
FIG. 15 is a left-side view of a vertical cross-section showing relevant portions of the supporting structure for the exhaust cleaning device.

As shown in FIGS. 14 and 15, the support frame 60 is constituted by a three-part structure that can be divided into a first part 61 that couples to the first band member 57, a second part 62 that couples to the second band member 58, and a third part 63 that couples to the engine 7. Also, the support frame 60 includes a first adjustment portion 64 that enables adjustment of the position of the first part 61 in the front-rear direction with respect to the engine 7, and a second adjustment portion 65 that enables adjustment of the position of the second part 62 in the front-rear direction with respect to the engine 7.

The first part 61 includes a first member 66 that is provided in the up-down direction and is bolted to a coupled portion 57A provided so as to hang from the first band member 57, in a state of being welded in the front-rear direction, and a second member 67 that is formed of a J-shaped curve. Also, the first part 61 is constituted by welding the second member 67 to the rear surface on the lower end side of the first member 66 in an orientation that is J-shaped in plan view and in which the long side thereof is located on the central side in the left-right direction of the vehicle body. The second member 67 is formed such that an end portion 67A on the long side thereof and an end portion 67B on the short side thereof are located away from each other in the left-right direction by a first set distance and are shifted by a second set distance in the front-rear direction so that they do not overlap each other in a view in the rightward direction (a view of the left side surface of the vehicle body). Also, the end portions 67A and 67B of these components are configured to be a first coupling portion 61A that detachably bolts to the two first coupled portions 63A included in the third part 63.

The second part 62 includes a first member 68 that is provided in the up-down direction and is bolted to a coupled portion 58A provided so as to hang from the second band member 58, in a state of being welded in the front-rear direction, and a second member 69 that is formed of a J-shaped curve. Also, the second part 62 is constituted by welding the second member 69 to the front surface on the lower end side of the first member 68 in an orientation of being in an inverse J shape in plan view and in which the long side thereof is located on the central side in the left-right direction of the vehicle body. The second member 69 is formed such that an end portion 69A on the long side thereof and an end portion 69B on the short side thereof are located away from each other in the left-right direction by a third set distance and are shifted in the front-rear direction by a fourth set distance so that they do not overlap each other in a view in the rightward direction (a view of the left side surface of the vehicle body). Also, the end portions 69A and 69B of these components are configured to be second coupling portions 62A that detachably bolt to the two second coupled portions 63B included in the third part 63.

The third part 63 includes a first member 70 that is composed of a groove-shaped steel material provided in the up-down direction and whose lower end portion is bolted to the left side surface of the upper front portion of the engine 7, a second member 71 that is composed of a steel panel material provided in the front-rear direction and whose rear end portion is bolted to a support unit 52C formed integrally with a flange 52B of the exhaust portion 52A of the exhaust manifold 52, and a third member 72 that is composed of a belt steel material provided in the front-rear direction and whose front portion is bolted to a cooling water supply unit 7B provided on the upper portion of the front end on the left side of the engine 7. Also, the third part 63 is configured such that the front end portion of the second member 71 is welded to the upper end of the first member 70 in a state of being mounted thereon, the rear portion of the third member 72 is welded to the front end portion of the bottom surface of the second member 71, and thus when the members 70 to 72 are in a state of being coupled to predetermined locations on the engine 7, the second member 71 is provided in a horizontal orientation according to which it is possible to receive and support from below the first members 66 and 68 of the first part 61 and the second part 62 that have been equipped by coupling to the band members 57 and 58 of the exhaust cleaning device 18.

The above-described two first coupled portions 63A that enable bolting with the two first coupling portions 61A included in the first part 61 are provided in a standing manner on the front end side of the upper surface of the second member 71 of the third part 63. The above-mentioned two second coupled portions 63B that enable bolting with the two second coupling portions 62A included in the second part 62 are provided in a standing manner on the rear end side of the upper surface of the second member 71. Similarly to the two first coupling portions 61A of the first part 61, the two first coupled portions 63A are disposed in a state of being located away from each other in the left-right direction by a first set distance and being positionally shifted in the front-rear direction by a second set distance such that they do not overlap each other in a view in the rightward direction (in a view of the left side surface of the vehicle body). Also, the two first coupled portions 63A include screw portions 63C, such as weld nuts that enable bolting with the first coupling portion 61A of the first part 61. Similarly to the two second coupling portions 62A of the second part 62, the two second coupled portions 63B are disposed in a state of being located away from each other in the left-right direction by a third set distance and being shifted in the front-rear direction by a fourth set distance such that they do not overlap each other in a view in the rightward direction (in a view of the left side surface of the vehicle body). Also, the two second coupled portions 63B include screw portions 63D, such as weld nuts that enable bolting with the second coupling portion 62A of the second part 62.

Elongated holes 61B that are formed so as to be longer in the front-rear direction along the lengthwise direction of the exhaust cleaning device 18 are formed in the first coupling portions 61A of the first part 61 for use in bolting with the first coupled portions 63A of the third part 63. Also, the elongated holes 61B constitute the above-described first adjustment portion 64 that enables adjustment of the position of the first part 61 in the front-rear direction with respect to the engine 7.

Elongated holes 62B that are formed so as to be longer in the front-rear direction along the lengthwise direction of the exhaust cleaning device 18 are formed in the second coupling portions 62A of the second part 62 for use in bolting with the second coupled portions 63B of the third part 63. Also, the elongated holes 62B constitute the above-described second adjustment portion 65 that enables adjustment of the position of the second part 62 in the front-rear direction with respect to the engine 7.

The first adjustment portion 64 and the second adjustment portion 65 have lengths in the up-down direction, which are lengths in the short-side direction of the elongated holes 61B and 62B thereof, that are larger than the bolt diameter of a bolts 73 that couple the first part 61 or the second part 62 with the third part 63, and thus it is possible to adjust the positions of the first part 61 and the second part 62 in the up-down direction with respect to the engine 7.

With the above-described configuration, in the case where the exhaust cleaning device 18 is to be attached to the engine 7, the first part 61 and the second part 62 of the support frame 60 are first bolted to the exhaust cleaning device 18. Also, the third part 63 of the support frame 60 is bolted to the upper left portion of the engine 7. Next, the first part 61 and the second part 62 of the support frame 60 that are equipped by coupling to the exhaust cleaning device 18 are mounted on the second member 71 of the third part 63 in a predetermined coupling orientation with respect to the second member 71. Also, after mounting, the corresponding first coupling portions 61A of the first part 61 are bolted to the first coupled portions 63A of the third part 63 via the above-described first adjustment portion 64, and the corresponding second coupling portions 62A of the second part 62 are bolted to the second coupled portions 63B of the third part 63 via the above-described second adjustment portion 65 while the flange 18C of the exhaust cleaning device 18 is bolted to the flange 52B of the exhaust manifold 52 in the engine 7.

Accordingly, regardless of individual differences relating to the positional relationship in the front-rear direction and the up-down direction between the flange 18C of the suction portion 18A in the exhaust cleaning device 18 and the coupled portions 57A and 58A of the band members 57 and 58, assembly errors relating to the positional relationship in the front-rear direction and the up-down direction between the flange 18C of the exhaust portion 18B in the exhaust cleaning device 18 and the coupled portions 57A and 58A of the band members 57 and 58, which occur in the case of disassembling and reassembling the exhaust cleaning device 18 to perform maintenance on the exhaust cleaning device 18, and the like, it is possible to provide the exhaust cleaning device 18 in a fixed manner at an appropriate position with respect to the engine 7, and as a result, it is possible to easily and appropriately connect the suction portion 18A of the exhaust cleaning device 18 to the exhaust portion 7A of the engine 7.

Also, by shifting positions in the front-rear direction of the two first coupling portions 61A of the first part 61, the two second coupling portions 62A of the second part 62, the two first coupled portions 63A of the third part 63, and the two second coupled portions 63B of the third part 63 such that they do not overlap each other in a view in the rightward direction, bolting of the corresponding first coupling portions 61A of the first part 61 and the first coupled portions 63A of the third part 63, and bolting of the corresponding second coupling portions 62A of the second part 62 and the second coupled portions 63B of the third part 63 can be performed from a location on the outer left side of the engine portion 2, along with bolting of the third part 63 to the engine 7 and bolting of the flange 18C of the exhaust cleaning device 18 and the flange 52B of the exhaust manifold 52.

Furthermore, by including screw portions 63C that enable bolting with the first part 61 and screw portions 63D that enable bolting with the second part 62 in the third part 63 that is fixed to the engine 7, it is easier to perform an operation of bolting the first part 61 and the second part 62 to the third part 63 from a location on the outer left side of the engine portion 2.

As shown in FIGS. 16A and 16B, a control unit 74 of a power steering mechanism 33, multiple hydraulic pipes 75 for the control unit 74, and the like are provided inside the steering frame 11. Also, the steering frame 11 includes a support member 77 that supports the engine control unit (hereinafter abbreviated as "ECU") 76 controlling the operation of the common rail system included in the engine 7.

The support member 77 is configured by a belt steel material formed of a curve, so as to include a first coupling portion 77A provided in the left-right direction, a second coupling portion 77B that extends rearward from the left end of the first coupling portion 77A, and a third coupling portion 77C that extends rearward from the right end of the first coupling portion 77A. Also, two left and right coupling holes (not shown) that enabling bolting with the ECU 76 via the rubber vibration insulators 78 are formed in the first coupling portion 77A. Also, front and rear coupling holes (not shown) that enable bolting with a left-side panel 79 of the steering frame 11 via the rubber vibration insulators 78 are formed in the second coupling portion 77B. Furthermore, a single engaging hole (not shown) that enables coupling by engagement with an engagement pin 81 protruding outwardly right from a right-side panel 80 of the steering frame 11 via the rubber vibration insulator 78 is formed in the third coupling portion 77C.

The rubber vibration insulators 78 include annular engagement grooves (not shown) that are fitted into corresponding coupling holes or engagement holes of the support member 77. Also, by fitting the engagement grooves into the corresponding coupling holes or engagement holes of the support member 77, it is possible to hold the rubber vibration insulators 78 in a fixed manner at predetermined positions on the support member 77.

With the above-described configuration, in a state in which the ECU 76 is assembled in the steering frame 11, the ECU 76 is supported via the left and right rubber vibration insulators 78 on the support member 77 that is supported on the steering frame 11 via one rubber vibration insulator 78 on the right side and two rubber vibration insulators 78 on the left side. Accordingly, it is possible to assemble the ECU 76 in the steering frame 11 in a state in which vibration standards in three directions, namely the front-rear direction, the left-right direction, and the up-down direction, are satisfied.

Also, by coupling the second coupling portion 77B of the support member 77 to the left-side panel 79 of the steering frame 11 at two points, it is possible to prevent the support member 77 from being displaced in a swinging manner using the point at which the right-side panel 80 of the steering frame 11 is coupled as the pivot point while using a configuration in which the third coupling portion 77C of the support member 77 is coupled to the right-side panel 80 of the steering frame 11 at one point.

Also, coupling of the support member 77 to the steering frame 11 can be made easier compared to the case of bolting the third coupling portion 77C of the support member 77 to the right-side panel 80 of the steering frame 11.

As shown in FIGS. 1, 2, and 16, due to the control unit 74 of the power steering mechanism 33, the multiple hydraulic pipes 75, and the like being provided inside of the steering frame 11 in the tractor, the ECU 76 can no longer be disposed inside of the steering frame 11. However, a space surrounded by the steering frame 11, the partitioning member 9, and the bottom blocking panel 24 of the tank support member 23 exists in a location forward of the steering frame 11.

In view of this, the ECU 76 is configured such that the entirety thereof is located in the space surrounded by the steering frame 11, the partitioning member 9, and the bottom blocking panel 24 of the tank support member 23 due to being bolted to the front surface side of the support member 77 via a coupling member 82 composed of a steel plate material.

Accordingly, it is possible to dispose the ECU 76 near the engine 7 and it is possible to shorten the wiring between the engine 7 and the ECU 76 without requiring labor such as changing the arrangement of devices in the periphery of the engine in order to ensure a space for disposing the ECU 76 near the engine 7. Also, due to the fact that the space surrounded by the steering frame 11, the partitioning member 9, and the bottom blocking panel 24 of the tank support member 23 is the thermally insulated space with respect to the engine 7 and the exhaust cleaning device 18, it is possible to prevent heat emitted from the engine 7 and the exhaust cleaning device 18 from having a bad influence on the ECU 76 without additionally equipping a thermal insulating member.

Note that in the case where only the steering post 34 in which the steering shaft is provided is located in the steering frame 11 by not including the power steering mechanism 33 for example, as shown in FIGS. 17A and 17B, a configuration is possible in which the entirety of the ECU 76 is located inside of the steering frame 11 due to being bolted on the outer surface side of the support member 77. Also, regarding the support member 77, it is possible to provide a fourth coupling portion 77D that has a shorter length extending rearward toward the second coupling portion 77B, and that extends downward from the lower end of the second coupling portion 77B, and a coupling hole (not shown) that enables bolting with the left-side panel 79 of the steering frame 11 via the rubber vibration insulator 78 may be formed in the fourth coupling portion 77D.

Other Embodiments

[1] The fuel tank 21 may have a shorter length in the front-rear direction so that the front end thereof is located rearward of the engine 7, for example.

[2] It is possible for the fuel tank 21 to not be provided with an inward-facing inclined portion 21A at the corner portion on the upper side thereof, for example.

[3] The bottom surface of the fuel tank 21 may be formed so as to be flat, for example.

[4] It is possible for the tank support member 23 to not be provided with one or both of the front blocking panel 25 and the side blocking panel 26, for example.

[5] The bottom blocking panel 24 of the tank support member 23 may be formed so as to be flat, for example.

[6] The tank support member 23 may be configured to include a tank mounting portion that is grid-shaped in plan view instead of the bottom blocking panel 24, for example.

[7] The hood support member 10 may be configured such that a single elastic member 46 is provided at a location in the center in the left-right direction of the upper end portion thereof and the fuel tank 21 is held in a fixed manner by being sandwiched in the up-down direction between the tank support member 23 and the elastic member 46.

[8] The hood support member 10 may be configured such that left and right elastic members 46 are provided on both the left and right side portions thereof and the fuel tank 21 is held in a fixed manner by being sandwiched in the left-right direction between the left and right elastic members 46.

[9] The hood support member 10 may be configured such that elastic members 46 are respectively provided at a location in the center in the left-right direction and on both the left and right side portions of the upper end portion of the hood support member 10, and the fuel tank 21 is held in a fixed manner by being sandwiched in the up-down direction between the tank support member 23 and the elastic member 46, and by being sandwiched in the left-right direction between the left and right elastic members 46, for example.

[10] The hood support member 10 may be configured such that left and right elastic members 46 that act from above the outer lateral sides of the fuel tank 21 with respect to the left and right corner portions on the upper side of the fuel tank 21 are provided at locations on both the left and right ends of the upper end portion of the hood support member 10, and the fuel tank 21 is held in a sandwiched manner between the tank support member 23 and the left and right elastic members 46, for example.

[11] The elastic members 46 may be constituted by compression springs, or they may be constituted by a rubber member and a compression spring.

[12] All of the elastic members 46 included in the hood support member 10 may be equipped in a fixed manner on the hood support member 10, or all of the elastic members 46 included in the hood support member 10 may be detachably equipped on the hood support member 10.

[13] For example, in a working vehicle configured such that the hood 15 is subjected to an opening and closing operation by swinging up and down with the front portion side as the pivot point due to disposing the engine portion 2 on the rear portion side of the vehicle body or the like, a configuration is possible in which the front portion side of the fuel tank 21 is held in a fixed manner by the hood support member 10 and the elastic members 46, and the rear portion side of the fuel tank 21 is held in a fixed manner by the fixing band 48.

[14] Various modifications of the configuration of the support frame 60 are possible, and for example, the following configuration is possible.

Figure 18:
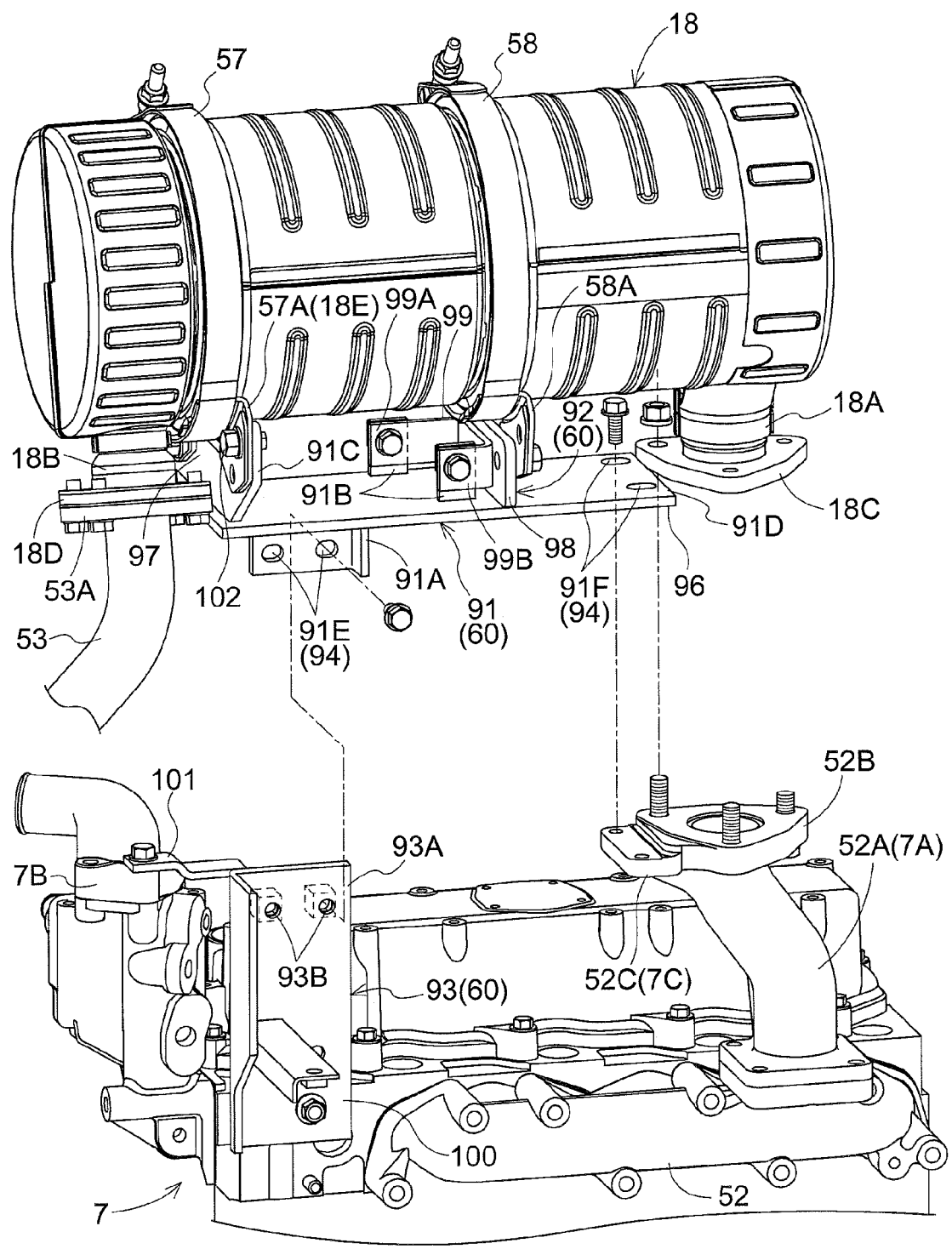
FIG. 18 is an exploded perspective view showing relevant portions of a supporting structure for an exhaust cleaning device according to another embodiment.
Figure 19:
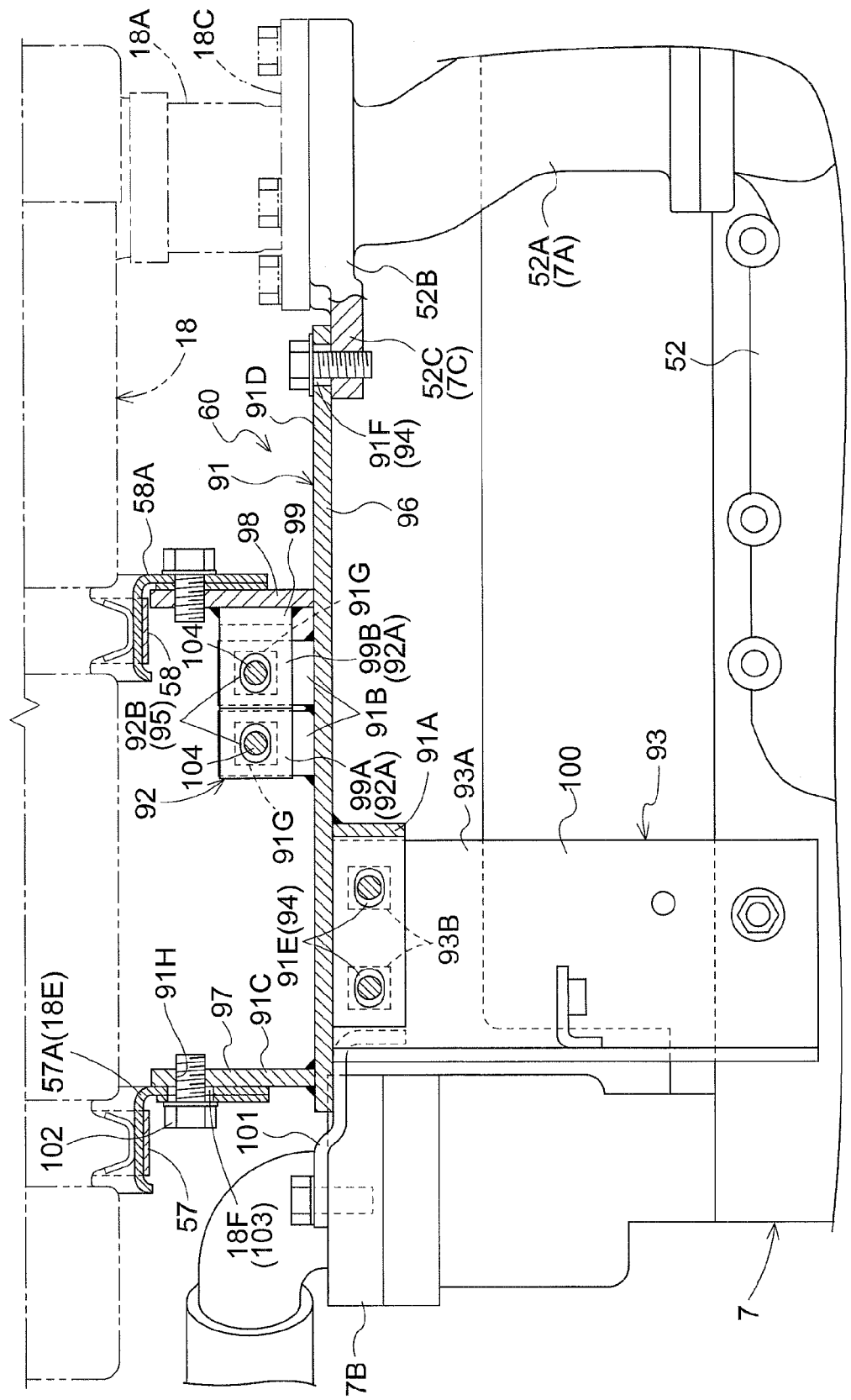
FIG. 19 is a left-side view of a vertical cross-section showing relevant portions of a supporting structure for an exhaust cleaning device according to another embodiment.
Figure 20:
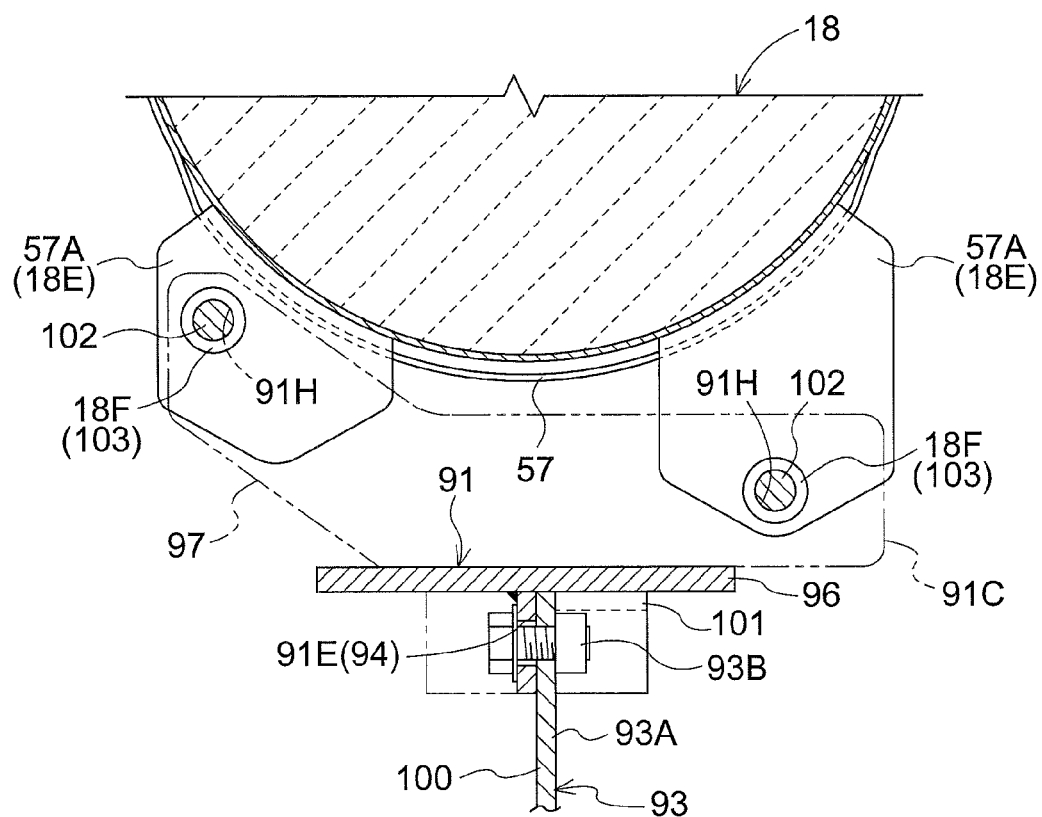
FIG. 20 is a rear view of a vertical cross-section showing relevant portions of a supporting structure for an exhaust cleaning device according to another embodiment.

As shown in FIGS. 18 to 20, the support frame 60 is constituted by a three-part structure that can be divided into a first part 91 that couples to the first band member 57 included on the front end side of the exhaust cleaning device 18, a second part 92 that couples to the second band member 58 included on the rear end side of the exhaust cleaning device 18, and a third part 93 that couples to the engine 7. Also, the support frame 60 includes a first adjustment portion 94 that enables adjustment of the position of the first part 91 in the front-rear direction with respect to the engine 7, and a second adjustment portion 95 that enables adjustment of the position of the second part 92 in the front-rear direction with respect to the engine 7.

With the exhaust cleaning device 18, left and right third coupled portions 18E that extend toward the first part 91 from the front end side, which is one side in the lengthwise direction of the exhaust cleaning device 18, are constituted by left and right coupled portions 57A that are provided so as to hang down on both the left and right end sides of the lower portion of the first band member 57.

The first part 91 is constituted by welding a vertical second member 97 in a standing orientation on the front end portion of a first member 96 that is composed of a steel panel material in a front-rear direction. Also, a first coupling portion 91A that is detachably bolted to a first coupled portion 93A included on the upper end portion of the third part 93 is provided so as to hang down on the front end side of the lower surface of the first member 96. Also, the two second coupled portions 91B that are detachably bolted to the two second coupling portions 92A included in the second part 92 are provided in a standing manner on the rear end side on the upper surface of the first member 96. Furthermore, left and right third coupling portions 91C for bolting in a state of being welded in the front-rear direction to the corresponding third coupled portions 18E of the exhaust cleaning device 18 are included in the second member 97. Even further, the rear end portion of the first member 96 constitutes a coupling portion 91D for detachably bolting to a support portion 52C that is formed integrally with the flange 52B of the exhaust portion 52A in the exhaust manifold 52 as the coupled portion 7C of the engine 7.

The second part 92 includes a first member 98 that is provided in the up-down direction and is bolted to a coupled portion 58A provided so as to hang from the second band member 58, in a state of being welded in the front-rear direction, and a second member 99 that is formed of a J-shaped curve. Also, the second part 92 is constituted by welding the second member 99 to the front surface on the lower end side of the first member 98 in an orientation of being in an inverse J shape in plan view and in which the long side thereof is located on the central side in the left-right direction of the vehicle body.

The third part 93 includes a first member 100 composed of an L-shaped steel material that is provided in the up-down direction, the lower end portion thereof being bolted to the left side surface of the upper front portion of the engine 7, and a second member 101 composed of a belt steel material that is provided in the front-rear direction, the front portion thereof being bolted to the cooling water supply unit 7B included above the front end on the left side of the engine 7. Also, a first coupled portion 93A to which the first coupling portion 91A of the first part 91 is detachably bolted is included on the upper end portion of the first member 100, the first coupled portion 93A being mounted on the upper end of the first member 100. The first coupled portion 93A includes two screw portions 93B such as weld nuts that enable bolting with the first coupling portion 91A of the first part 91, the two screw portions 93B being aligned in the front-rear direction.

Two elongated holes 91E that are formed so as to be longer in the front-rear direction along the lengthwise direction of the exhaust cleaning device 18 are formed so as to be aligned in the front-rear direction on the first coupling portion 91A on the first part 91 for use in bolting with the first coupled portion 93A of the third part 93. Also, two elongated holes 91F that are formed so as to be longer in the front-rear direction along the lengthwise direction of the exhaust cleaning device 18 are formed in alignment in the left-right direction on the coupling portion 91D, for use in bolting with the bolted portion 7C of the engine 7. Also, the elongated holes 91E and 91F constitute the above-described first adjustment portion 94 that enables adjustment of the position of the first part 61 in the front-rear direction with respect to the engine 7.

In the first part 91, the two second coupled portions 91B include screw portions 91G such as weld nuts that enable bolting with the second coupling portion 92A of the second part 92. On the other hand, in the second part 92, elongated holes 92B that are formed so as to be longer in the front-rear direction along the lengthwise direction of the exhaust cleaning device 18 are formed in the two end portions 99A and 99B of the second member 99 so that the two end portions 99A and 99B are the second coupling portion 92A, for use in bolting with the second coupled portions 91B of the first part 91. Also, the elongated holes 92B constitute the above-described second adjustment portion 95 that enables adjustment of the position of the second part 92 in the front-rear direction with respect to the engine 7.

The left and right third coupling portions 91C of the first part 91 include screw portions 91H such as screw holes that enable bolting with the corresponding third coupled portions 18E of the exhaust cleaning device 18. On the other hand, coupling holes 18F that enable bolting with the corresponding third coupling portions 91C of the first part 91 are formed on the third coupled portions 18E of the exhaust cleaning device 18. The coupling holes 18F have a hole diameter that is larger than the bolt diameter of the bolts 102 that screw into the screw portions 91H of the first part 91. Also, the coupling holes 18F constitute a third adjustment portion 103 for enabling adjustment of the position of the third coupled portions 18E of the exhaust cleaning device 18 in the up-down direction with respect to the engine 7.

In the exhaust cleaning device 18, the left and right third coupled portions 18E are disposed at positions separated from each other in the left-right direction by a first set distance, in a state of being shifted in the up-down direction by a second set distance such that the third coupled portions 18E do not overlap one another in a view in the rightward direction (in a view of the left side surface of the vehicle body). Also, by shifting the positions in the up-down direction, the left-side third coupled portion 18E is located above the lowest edge of the exhaust cleaning device 18, and the right-side third coupled portion 18E is located below the lowest edge of the exhaust cleaning device 18. The two second coupling portions 92A are disposed on the second part 92 at positions separated from each other in the left-right direction by a third set distance, in a state of being shifted in the front-rear direction by a fourth set distance such that the second coupling portions 92A do not overlap in a view in the rightward direction (in a view of the left side surface of the vehicle body). Similarly to the left and right third coupled portions 18E of the exhaust cleaning device 18, the two third coupling portions 91C are disposed on the first part 91 at positions separated from each other in the left-right direction by the first set distance, in a state of being shifted in the up-down direction by the second set distance such that the third coupling portions 91C do not overlap in a view in the rightward direction (in a view of the left side surface of the vehicle body). Also, by shifting the positions in the up-down direction, a configuration is obtained in which, in a state in which the exhaust cleaning device 18 is coupled, the left-side third coupling portion 91C is located above the lowest edge of the exhaust cleaning device 18, and the right-side third coupling portion 91C is located below the lowest edge of the exhaust cleaning device 18. Also, similarly to the two second coupling portions 92A of the second part 92, the two second coupled portions 91B are disposed at positions separated from each other in the left-right direction by the third set distance, in a state of being shifted in the front-rear direction by the fourth set distance such that the second coupled portions 91B do not overlap in a view in the rightward direction (in a view of the left side surface of the vehicle body).

The length in the up-down direction, which is the length in the short-side direction of the elongated holes 92B of the second adjustment portion 95, is made to be larger than the bolt diameter of the bolts 104 that couple the first part 91 and the second part 92, and thus the second adjustment portion 95 enables adjustment of the position of the second part 92 in the up-down direction with respect to the engine 7.

With the above-described configuration, in the case where the exhaust cleaning device 18 is to be coupled to the engine 7, the second part 92 of the support frame 60 is first bolted to the exhaust cleaning device 18. Also, the third part 93 of the support frame 60 is bolted to the upper left portion of the engine 7. Next, bolting in a state in which the exhaust cleaning device 18 is temporarily joined to the first part 61 of the support frame 60 is performed via the above-described third adjustment portion 103. Also, bolting in a state in which the second part 92 is temporarily joined to the first part 61 is performed via the above-described second adjustment portion 95. Thereafter, the first part 61 that was temporarily joined to the exhaust cleaning device 18 and the second part 92 is mounted spanning the coupled portion 7C and the third part 93 of the engine 7, and in this state, is bolted in a state of being temporarily joined to the coupled portion 7C and the third part 93 of the engine 7 via the above-described first adjustment portion 94. Then, after temporarily joining, the temporarily joined locations are fastened and the flange 18C of the exhaust cleaning device 18 is bolted to the flange 52B of the exhaust manifold 52 while the positional adjustment is performed using the adjustment portions 94, 95, and 103.

Accordingly, regardless of individual differences relating to the positional relationship in the front-rear direction and the up-down direction between the flange 18C of the suction portion 18A in the exhaust cleaning device 18 and the coupled portions 57A and 58A of the band members 57 and 58, assembly errors relating to the positional relationship in the front-rear direction and the up-down direction between the flange 18C of the exhaust portion 18B in the exhaust cleaning device 18 and the coupled portions 57A and 58A of the band members 57 and 58, which occur in the case of disassembling and reassembling the exhaust cleaning device 18 to perform maintenance on the exhaust cleaning device 18, and the like, it is possible to provide the exhaust cleaning device 18 in a fixed manner at an appropriate position with respect to the engine 7, and as a result, it is possible to easily and appropriately connect the suction portion 18A of the exhaust cleaning device 18 to the exhaust portion 7A of the engine 7.

Also, by shifting the positions in the up-down direction of the left and right third coupled portions 18E in the exhaust cleaning device 18 and the left and right third coupling portions 91C in the first part 91 such that they do not overlap each other in a view in the rightward direction so as to obtain the above-described configuration, and by shifting positions in the front-rear direction of the two second coupled portions 91B of the first part 91 and the two second coupling portions 92A of the second part 92 such that they do not overlap each other in a view in the rightward direction, bolting of the corresponding third coupled portions 18E of the exhaust cleaning device 18 and the third coupling portions 91C of the first part 91, and bolting of the corresponding second coupled portions 91B of the first part 91 and the second coupling portions 92A of the second part 92 can be performed from a location on the outer left side of the engine portion 2, along with bolting of the coupling member 91D of the first part 91 and the third part 93 to the engine 7 and bolting of the flange 18C of the exhaust cleaning device 18 and the flange 52B of the exhaust manifold 52.

Furthermore, by including the screw portions 93B that enable bolting with the first part 91 on the third part 93 fixed to the engine 7 and including the screw portions 91G that enable bolting with the second part 92 on the first part 91 fixed to the engine 7 and the third part 93, it is easier to perform an operation of bolting the first part 91 to the third part 93 and an operation of bolting the second part 92 to the first part 91 from a location outside and to the left of the engine portion 2.

[15] The support frame 60 illustrated in the above-described embodiment may be configured such that at least one of the first part 61 and the second part 62 is formed in an L shape in a view in the short-side direction of the exhaust cleaning device 18, the elongated holes 61B and 62B that are longer in the direction along the lengthwise direction of the exhaust cleaning device 18 are formed on the bottom portion welded to the third part 63, and the elongated holes 61B and 62B constitute the first adjustment portion 64 or the second adjustment portion 65.

Also, with this configuration as well, by making the length in the short-side direction of the elongated holes 61B and 62B greater than the bolt diameter, it is possible to allow the first adjustment portion 64 and the second adjustment portion 65 to each perform adjustment of the position of the first part 61 or the second part 62 in the short-side direction (a direction different from the short-side direction of the elongated holes 61B and 62B in the support frame 60 illustrated in the above-described embodiment) of the elongated holes 61B and 62B with respect to the engine 7.

[16] In the support frame 60 illustrated in the embodiment above, the elongated holes 61B that are longer in the direction along the lengthwise direction of the exhaust cleaning device 18 may be formed in the first coupled portion 63A, and the elongated holes 61B may constitute the first adjustment portion 64. Also, the elongated holes 61B that are longer in the direction along the lengthwise direction of the exhaust cleaning device 18 may be formed in both the first coupling portion 61A and the first coupled portion 63A, and the elongated holes 61B may constitute the first adjustment portion 64.

[17] In the support frame 60 illustrated in the embodiment above, the elongated holes 62B that are longer in the direction along the lengthwise direction of the exhaust cleaning device 18 may be formed in the second coupled portion 63B, and the elongated holes 62B may constitute the second adjustment portion 65. Also, the elongated holes 62B that are longer in the direction along the lengthwise direction of the exhaust cleaning device 18 may be formed in both the second coupling portion 62A and the second coupled portion 63B, and the elongated holes 62B may constitute the second adjustment portion 65.

[17] In the support frame 60 illustrated in the other embodiment [1] above, the elongated holes 91E and 91F that are longer in the direction along the lengthwise direction of the exhaust cleaning device 18 may be formed in the coupled portion 7C and the first coupled portion 93A, and the elongated holes 91E and 91F may constitute the first adjustment portion 94. Also, the elongated holes 91E and 91F that are longer in the direction along the lengthwise direction of the exhaust cleaning device 18 may be formed in the coupling portion 91D, the first coupling portion 91A, the coupled portion 7C, and the first coupled portion 93A, and the elongated holes 91E and 91F may constitute the first adjustment portion 94.

[18] In the support frame 60 illustrated in the other embodiment [1] above, the elongated holes 92B that are longer in the direction along the lengthwise direction of the exhaust cleaning device 18 may be formed in the second coupled portions 91B, and the elongated holes 92B may constitute the second adjustment portion 95. Also, the elongated holes 92B that are longer in the direction along the lengthwise direction of the exhaust cleaning device 18 may be formed on both the second coupling portions 92A and the second coupled portions 91B, and the elongated holes 92B may constitute the second adjustment portion 95.

[19] In the support frame 60 illustrated in the other embodiment [1] above, the coupling holes 18F whose lengths in the direction that is the same as the short-side direction of the elongated holes 92B of the second adjustment portion 95 are larger than the bolt diameter may be formed in the third coupling portions 91C, and the coupling holes 18F may constitute the third adjustment portion 103 that enables the position of the third coupled portions 18E to be adjusted in the short-side direction of the elongated holes 92B with respect to the engine 7. Also, the coupling holes 18F whose length in the direction that is the same as the short-side direction of the elongated holes 92B of the second adjustment portion 95 are larger than the bolt diameter may be formed in both the third coupling portions 91C and the third coupled portions 18E, and the coupling holes 18F may constitute the third adjustment portion 103 that enables the position of the third coupled portions 18E to be adjusted in the short-side direction of the elongated holes 92B with respect to the engine 7.

[20] Screw holes, weld nuts, weld bolts, and the like can be used as the screw portions 63C, 63D, 91G, 91H, and 93B of the support frame 60.

[21] The engine 7 may be a horizontal diesel engine or the like, for example.

[22] The exhaust cleaning device 18 may be configured such that its shape in a view in the lengthwise direction thereof is that of an oval.

[23] The exhaust cleaning device 18 may be provided such that the lengthwise direction thereof is in a lateral orientation along the left-right direction of the vehicle body, for example. Also, the exhaust cleaning device 18 may be provided in an inclined orientation in which the lengthwise direction thereof is inclined in the left-right direction with respect to the front-rear direction of the vehicle body.

The present invention can be applied to a working vehicle such as a tractor, a riding lawnmower, a riding rice transplanter, a backhoe, or a haulage vehicle.

What is claimed is:

1. A working vehicle comprising:
   a fuel tank;
   a tank support member configured to receive and support the fuel tank from below; and
   an inverse U-shaped hood support member provided in a standing manner in a state of spanning left and right of the fuel tank, the hood support member including a rubber member that acts on an upper portion side of the fuel tank so as to hold the fuel tank at a predetermined position on the tank support member,
   wherein the rubber member includes left and right rubber members that act externally from above lateral sides of the fuel tank and on left and right corner portions on the upper side of the fuel tank, and the fuel tank is held in a sandwiched manner between the tank support member and the left and right rubber members due to the elasticity of the left and right rubber members.

2. The working vehicle according to claim 1, wherein one of the left and right rubber members is fixed to the inner surface of the hood support member, and the other one is detachably coupled to the hood support member.

3. The working vehicle according to claim 1, wherein
   the hood support member and the rubber member are configured to act on one of the front and rear sides of the fuel tank,
   an inverse U-shaped fixing band that is detachably coupled to the tank support member in a state of spanning left and right of the other of the front and rear sides of the fuel tank is included, and
   the fuel tank has a groove portion into which the fixing band is fitted on the other of the front and rear sides of the fuel tank.

4. A working vehicle comprising:
a fuel tank;
a tank support member configured to receive and support the fuel tank from below; and
an inverse U-shaped hood support member provided in a standing manner in a state of spanning left and right of the fuel tank, the hood support member including an elastic member that acts on an upper portion side of the fuel tank so as to hold the fuel tank at a predetermined position on the tank support member;
wherein the elastic member includes left and right elastic members that act externally from above lateral sides of the fuel tank and on left and right corner portions on the upper side of the fuel tank, and the fuel tank is held in a sandwiched manner between the tank support member and the left and right elastic members due to the elasticity of the left and right elastic members.

5. The working vehicle according to claim 4, wherein one of the left and right elastic members is fixed to the inner surface of the hood support member, and the other one is detachably coupled to the hood support member.

6. A working vehicle comprising:
a fuel tank;
a tank support member configured to receive and support the fuel tank from below; and
an inverse U-shaped hood support member provided in a standing manner in a state of spanning left and right of the fuel tank, the hood support member including an elastic member that acts on an upper portion side of the fuel tank so as to hold the fuel tank at a predetermined position on the tank support member;
wherein the hood support member and the elastic member are configured to act on one of the front and rear sides of the fuel tank,
an inverse U-shaped fixing band that is detachably coupled to the tank support member in a state of spanning left and right of the other of the front and rear sides of the fuel tank is included, and
the fuel tank has a groove portion into which the fixing band is fitted on the other of the front and rear sides of the fuel tank.

7. The working vehicle according to claim 6, wherein the elastic member includes left and right elastic members that act externally from above lateral sides of the fuel tank and on left and right corner portions on the upper side of the fuel tank, and the fuel tank is held in a sandwiched manner between the tank support member and the left and right elastic members due to the elasticity of the left and right elastic members.

8. The working vehicle according to claim 7, wherein one of the left and right elastic members is fixed to the inner surface of the hood support member, and the other one is detachably coupled to the hood support member.

9. A working vehicle comprising:
a fuel tank;
a tank support member configured to receive and support the fuel tank from below; and
an inverse U-shaped hood support member provided in a standing manner in a state of spanning left and right of the fuel tank, the hood support member including a rubber member that acts on an upper portion side of the fuel tank so as to hold the fuel tank at a predetermined position on the tank support member,
wherein the hood support member and the rubber member are configured to act on one of the front and rear sides of the fuel tank,
wherein an inverse U-shaped fixing band that is detachably coupled to the tank support member in a state of spanning left and right of the other of the front and rear sides of the fuel tank is included, and
wherein the fuel tank has a groove portion into which the fixing band is fitted on the other of the front and rear sides of the fuel tank.

\* \* \* \* \*